US007606744B1

(12) United States Patent
Foster (10) Patent No.: US 7,606,744 B1
(45) Date of Patent: Oct. 20, 2009

(54) SYSTEM AND METHOD FOR REAL-TIME PRICING WITH VOLUME DISCOUNTING

(75) Inventor: Robert A. Foster, Brighton (AU)

(73) Assignee: Financial Systems Technology (Intellectual Property) Pty. Ltd. (AU)

( * ) Notice: Subject to any disclaimer, the term of this patent is extended or adjusted under 35 U.S.C. 154(b) by 1097 days.

(21) Appl. No.: 09/785,783

(22) Filed: Feb. 16, 2001

(51) Int. Cl.
*G07F 19/00* (2006.01)
(52) U.S. Cl. .......................................... 705/34; 705/30
(58) Field of Classification Search .................... 705/34, 705/30
See application file for complete search history.

(56) References Cited

U.S. PATENT DOCUMENTS

| | | | | |
|---|---|---|---|---|
| 5,550,734 | A | 8/1996 | Tarter et al. | 364/401 R |
| 5,559,313 | A | 9/1996 | Claus et al. | 235/280 |
| 5,590,197 | A * | 12/1996 | Chen et al. | 705/65 |
| 5,604,899 | A | 2/1997 | Doktor | 395/603 |
| 5,613,012 | A | 3/1997 | Hoffman et al. | 382/115 |

(Continued)

OTHER PUBLICATIONS

White, Ron, How Computers Work, Millennium Ed. Que Corporation, Sep. 1999.*

(Continued)

*Primary Examiner*—Elaine Gort
(74) *Attorney, Agent, or Firm*—Haynes and Boone, LLP (57) ABSTRACT

A system and method are provided for facilitating real-time pricing with volume discounting. The method includes receiving a request for a real-time price quote for a transaction from a first account. The request is received at a first instance in time during a billing cycle. The method also includes determining a first production service, where the first production service is a component of the transaction, and determining a count of first production service instances representing the first production service in the received transaction. The method further includes determining a billable entity for the transaction, where the billable entity includes one or more related accounts, and the related accounts includes the first account. The method additionally includes determining a total of the first production service instances purchased by the related accounts during the billing cycle up to the first instance in time, where the total includes the count of the first production service instances in the received transaction. The method also includes determining a price applicable to the total of the first production service instances based on a pricing method, and apportioning the price to the received transaction based on the count of the first production service instance in the received transaction. The system includes a computer-readable storage medium that has stored thereon computer instructions that, when executed by a computer, cause the computer to receive a request for a real-time price quote for a transaction. The request is received at a first instance in time during a billing cycle, and the transaction includes a number of first production service instances, where each instance represents a first production service. The computer instructions also cause the computer to determine a total count of production service instances consumed during the billing cycle up to the first instance in time based on a pricing relationship, and determine a billing service appropriate for the first production service. The computer instructions further cause the computer to calculate a price for the first production service from a price table based on a first attribute for the billing service and the total count of production service instances consumed, and apportion the price to the received transaction based on the number of first production service instances in the transaction.

38 Claims, 2 Drawing Sheets

U.S. PATENT DOCUMENTS

| | | | | |
|---|---|---|---|---|
| 5,617,567 | A | 4/1997 | Doktor | 395/602 |
| 5,630,127 | A | 5/1997 | Moore et al. | 395/615 |
| 5,636,117 | A | 6/1997 | Rothstein | 395/204 |
| 5,652,882 | A | 7/1997 | Doktor | 395/617 |
| 5,675,779 | A | 10/1997 | Doktor | 395/604 |
| 5,682,482 | A | 10/1997 | Burt et al. | 395/242 |
| 5,704,044 | A | 12/1997 | Tarter et al. | 395/204 |
| 5,706,442 | A * | 1/1998 | Anderson et al. | 705/27 |
| 5,742,775 | A | 4/1998 | King | 395/238 |
| 5,747,784 | A * | 5/1998 | Walter et al. | 235/383 |
| 5,757,917 | A * | 5/1998 | Rose et al. | 705/79 |
| 5,826,259 | A | 10/1998 | Doktor | 707/4 |
| 5,838,812 | A | 11/1998 | Pare, Jr. et al. | 382/115 |
| 5,852,812 | A | 12/1998 | Reeder | 705/39 |
| 6,047,274 | A * | 4/2000 | Johnson et al. | 705/412 |
| 6,052,672 | A | 4/2000 | Foster | 705/35 |
| 6,101,484 | A * | 8/2000 | Halbert et al. | 705/26 |
| 6,167,378 | A * | 12/2000 | Webber, Jr. | 705/8 |
| 6,182,054 | B1 * | 1/2001 | Dickinson et al. | 705/34 |
| 6,324,522 | B2 * | 11/2001 | Peterson et al. | 705/28 |
| 6,341,271 | B1 * | 1/2002 | Salvo et al. | 705/28 |
| 6,584,451 | B1 * | 6/2003 | Shoham et al. | 705/37 |
| 6,598,029 | B1 * | 7/2003 | Johnson et al. | 705/37 |
| 6,631,356 | B1 * | 10/2003 | Van Horn et al. | 705/26 |
| 6,928,416 | B1 * | 8/2005 | Bertash | 705/26 |
| 2002/0026394 | A1 * | 2/2002 | Savage et al. | 705/34 |

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Borland's Paradox for Windows User's Guide, Borland International, Inc, 1994.*

Muller, Nathan J., Desktop Encyclopedia of the Internet, Artech House, Inc., 1998.*

Hirschey, Mark, and Pappas, James L.; Managerial Economics, 8th Ed., The Dryden Press, Fort Worth, TX, 1996.*

Dobler, Donald W. and Burt, David N., Purchasing and Supply Management, Text & Cases, 6th Ed., The McGraw-Hill Companies, Inc., 1996.*

Brigham, Eugene F. & Gapenski, Louis C., Financial Management, Theroy & Practice, 7th Ed., The Dryden Press, Harcourt Brace & Co., 1994.*

Rose, Peter S., et. al. Financial Institution, Understanding and Manging Financial Services, 4th Edition, Richard D. Irwin, Inc., 1993.*

White, James J., and Summers, Robert S., Uniform Commercial Code, 4th Ed., West Publishing Co., St. Paul, MN, 1995.*

Restatement of the Law, Second, Contracts 2d, §§1-385 & their Comments, American Law Institute, St. Paul MN, 1981.*

Howcroft, "Contemporary issues in UK bank delivery systems", Inter. Jour. Of Service Industry Management, vol. 3, No. 1, pp. 39-56, ISBN 0956-4233, 1992.

"Teller fees translate to torrid ATM activity", Debit Card News, vol. 1, No. 4, p. 1+, Jun. 3, 1995.

"The Smart Card's Chief Advocate", Credit Card Management, vol. 10, No. 1, p. 26+, ISBN: 0896-9329, 1992.

"Banks Freeze Debit Fees To Shorten Teller Lines", Debit Card News, vol. I, No. 1, p. 1+, Jun. 15, 1995.

* cited by examiner

SYSTEM AND METHOD FOR REAL-TIME PRICING WITH VOLUME DISCOUNTING

RELATED PATENTS

The present application is related to the commonly owned U.S. Pat. No. 6,052,672 entitled "DATA PROCESSING SYSTEM FOR COMPLEX PRICING AND TRANSACTIONAL ANALYSIS," which is hereby incorporated by reference herein in its entirety.

RELATED APPLICATIONS

The present application is related to the co-pending and commonly owned U.S. patent application Ser. No. 09/183,335 entitled "DATA PROCESSING SYSTEM FOR PRICING, COSTING AND BILLING OF FINANCIAL TRANSACTIONS," which is hereby incorporated by reference herein in its entirety.

COMPUTER PROGRAM LISTING APPENDIX

The computer program listing appendix attached hereto consists of two (2) identical compact disks, copy 1 and copy 2, each containing a listing of the software code for embodiments of components of this invention. Each compact disk contains the following files (date and time of creation, size in bytes, filename):

```
Directory of D:\
02/01/01   09:33a   <DIR>   .
02/01/01   09:33a   <DIR>   ..
01/31/01   03:31p   <DIR>   M-9381 US
Directory of D:\M-9381 US
01/31/01   03:31p   <DIR>   .
02/01/01   09:33a   <DIR>   ..
01/31/01   03:24p   <DIR>   CIS
01/31/01   03:27p   <DIR>   COR
01/31/01   03:27p   <DIR>   LIB
01/31/01   03:27p   <DIR>   LXN
01/31/01   03:28p   <DIR>   MFS
01/31/01   03:30p   <DIR>   MSC
01/31/01   03:30p   <DIR>   SCRIPTS
01/31/01   03:31p   <DIR>   SQL
01/31/01   03:35p   <DIR>   WEBAPP
Directory of D:\M-9381 US\CIS
01/31/01   03:24p   <DIR>   .
01/31/01   03:31p   <DIR>   ..
01/29/01   12:28p           35,689 BCIS401__CBL.TXT
01/29/01   12:29p           51,724 BCIS411__CBL.TXT
01/29/01   12:29p           13,593 BCIS422__CBL.TXT
01/29/01   10:38a           48,235 ICIS100__CBL.TXT
01/29/01   10:50a           32,018 ICIS100__CPY.TXT
01/29/01   10:38a           44,419 ICIS101__CBL.TXT
01/29/01   10:50a           31,518 ICIS101__CPY.TXT
01/29/01   10:38a           42,227 ICIS102__CBL.TXT
01/29/01   10:51a           25,203 ICIS102__CPY.TXT
01/29/01   10:38a           51,159 ICIS103__CBL.TXT
01/29/01   10:51a           38,667 ICIS103__CPY.TXT
01/29/01   10:38a           46,375 ICIS104__CBL.TXT
01/29/01   10:51a           35,859 ICIS104__CPY.TXT
01/29/01   10:38a           51,279 ICIS106__CBL.TXT
01/29/01   10:51a           38,280 ICIS106__CPY.TXT
01/29/01   10:38a           39,904 ICIS111__CBL.TXT
01/29/01   10:51a           25,475 ICIS111__CPY.TXT
01/29/01   10:38a           32,573 ICIS112__CBL.TXT
01/29/01   10:51a           16,025 ICIS112__CPY.TXT
01/29/01   10:38a           40,689 ICIS140__CBL.TXT
01/29/01   10:51a           24,440 ICIS140__CPY.TXT
01/29/01   10:38a           31,169 ICIS141__CBL.TXT
01/29/01   10:51a           16,346 ICIS141__CPY.TXT
01/29/01   10:38a           67,112 ICIS142__CBL.TXT
01/29/01   10:51a           47,991 ICIS142__CPY.TXT
```

-continued

```
01/29/01   10:38a           43,061 ICIS143__CBL.TXT
01/29/01   10:51a           30,175 ICIS143__CPY.TXT
01/29/01   10:38a           52,646 ICIS190__CBL.TXT
01/29/01   10:51a           35,127 ICIS190__CPY.TXT
01/29/01   10:38a           54,168 ICIS191__CBL.TXT
01/29/01   10:51a           36,971 ICIS191__CPY.TXT
01/29/01   10:38a           69,765 ICIS192__CBL.TXT
01/29/01   10:51a           50,485 ICIS192__CPY.TXT
01/29/01   10:38a           67,750 ICIS193__CBL.TXT
01/29/01   10:51a           49,658 ICIS193__CPY.TXT
01/29/01   10:38a           52,048 ICIS194__CBL.TXT
01/29/01   10:51a           35,084 ICIS194__CPY.TXT
01/29/01   10:39a           72,666 ICIS196__CBL.TXT
01/29/01   10:51a           52,178 ICIS196__CPY.TXT
01/29/01   10:39a           62,728 ICIS199__CBL.TXT
01/29/01   10:51a           45,142 ICIS199__CPY.TXT
01/29/01   10:39a           51,443 ICIS701__CBL.TXT
01/29/01   10:51a           38,177 ICIS701__CPY.TXT
01/29/01   10:39a           72,098 ICIS702__CBL.TXT
01/29/01   10:51a           52,566 ICIS702__CPY.TXT
01/29/01   10:39a           46,680 ICIS703__CBL.TXT
01/29/01   10:51a           33,441 ICIS703__CPY.TXT
01/29/01   10:39a           68,603 ICIS704__CBL.TXT
01/29/01   10:51a           48,149 ICIS704__CPY.TXT
01/29/01   10:39a           49,424 ICIS705__CBL.TXT
01/29/01   10:51a           38,919 ICIS705__CPY.TXT
01/29/01   10:39a           58,596 ICIS706__CBL.TXT
01/29/01   10:51a           41,118 ICIS706__CPY.TXT
01/29/01   10:39a           49,731 ICIS707__CBL.TXT
01/29/01   10:51a           38,992 ICIS707__CPY.TXT
01/29/01   10:39a           62,834 ICIS708__CBL.TXT
01/29/01   10:51a           44,418 ICIS708__CPY.TXT
01/29/01   10:39a           45,267 ICIS709__CBL.TXT
01/29/01   10:52a           27,989 ICIS709__CPY.TXT
01/29/01   10:39a           70,396 ICIS710__CBL.TXT
01/29/01   10:52a           50,847 ICIS710__CPY.TXT
01/29/01   10:39a           50,533 ICIS711__CBL.TXT
01/29/01   10:52a           39,666 ICIS711__CPY.TXT
01/29/01   10:39a           66,244 ICIS712__CBL.TXT
01/29/01   10:52a           47,318 ICIS712__CPY.TXT
01/29/01   10:39a           43,092 ICIS713__CBL.TXT
01/29/01   10:52a           26,459 ICIS713__CPY.TXT
01/29/01   10:39a           73,837 ICIS714__CBL.TXT
01/29/01   10:52a           53,861 ICIS714__CPY.TXT
01/29/01   10:39a           37,260 ICIS717__CBL.TXT
01/29/01   10:52a           20,949 ICIS717__CPY.TXT
01/29/01   10:39a           72,726 ICIS718__CBL.TXT
01/29/01   10:52a           53,256 ICIS718__CPY.TXT
01/29/01   10:39a           70,867 ICIS723__CBL.TXT
01/29/01   10:52a           58,288 ICIS723__CPY.TXT
01/29/01   10:39a           76,278 ICIS724__CBL.TXT
01/29/01   10:52a           55,563 ICIS724__CPY.TXT
01/29/01   10:39a           52,323 ICIS727__CBL.TXT
01/29/01   10:52a           40,879 ICIS727__CPY.TXT
01/29/01   10:39a           72,519 ICIS728__CBL.TXT
01/29/01   10:52a           51,904 ICIS728__CPY.TXT
01/29/01   10:39a           69,747 ICIS729__CBL.TXT
01/29/01   10:52a           56,052 ICIS729__CPY.TXT
01/29/01   10:39a           73,137 ICIS730__CBL.TXT
01/29/01   10:52a           52,659 ICIS730__CPY.TXT
01/29/01   10:39a           50,833 ICIS731__CBL.TXT
01/29/01   10:52a           39,710 ICIS731__CPY.TXT
01/29/01   10:39a           65,788 ICIS732__CBL.TXT
01/29/01   10:52a           46,050 ICIS732__CPY.TXT
01/29/01   10:39a           64,002 ICIS999__CBL.TXT
01/29/01   10:52a           45,683 ICIS999__CPY.TXT
01/29/01   12:32p           46,994 LCIS401__CBL.TXT
01/29/01   12:32p           27,233 LCIS402__CBL.TXT
01/29/01   12:32p           24,540 LCIS403__CBL.TXT
01/29/01   12:32p           23,580 LCIS404__CBL.TXT
01/29/01   12:32p           23,940 LCIS405__CBL.TXT
01/29/01   12:32p           28,032 LCIS406__CBL.TXT
01/29/01   12:32p           22,800 LCIS407__CBL.TXT
01/29/01   12:33p           21,556 LCIS408__CBL.TXT
01/29/01   12:33p           33,308 LCIS409__CBL.TXT
01/29/01   12:33p           31,048 LCIS411__CBL.TXT
01/29/01   12:33p           21,525 LCIS428__CBL.TXT
01/29/01   12:33p           21,497 LCIS429__CBL.TXT
01/29/01   12:33p           34,823 LCIS430__CBL.TXT
```

-continued

| | | | |
|---|---|---|---|
| 01/29/01 | 12:33p | 32,605 | LCIS431__CBL.TXT |
| 01/29/01 | 12:33p | 27,771 | LCIS432__CBL.TXT |
| 01/29/01 | 12:33p | 29,055 | LCIS433__CBL.TXT |
| 01/29/01 | 12:34p | 27,890 | LCIS434__CBL.TXT |
| 01/29/01 | 12:34p | 23,259 | LCIS440__CBL.TXT |
| 01/29/01 | 12:34p | 22,995 | LCIS441__CBL.TXT |
| 01/29/01 | 12:34p | 23,029 | LCIS442__CBL.TXT |
| 01/29/01 | 12:34p | 23,025 | LCIS443__CBL.TXT |
| 01/29/01 | 12:34p | 22,786 | LCIS444__CBL.TXT |
| 01/29/01 | 12:34p | 27,668 | LCIS445__CBL.TXT |
| 01/29/01 | 12:34p | 29,873 | LCIS449__CBL.TXT |
| 01/29/01 | 12:34p | 76,689 | LCIS451__CBL.TXT |
| 01/29/01 | 10:46a | 317 | LCIS451__CPY.TXT |
| 01/29/01 | 12:34p | 55,568 | LCIS452__CBL.TXT |
| 01/29/01 | 10:46a | 317 | LCIS452__CPY.TXT |
| 01/29/01 | 12:35p | 54,293 | LCIS455__CBL.TXT |
| 01/29/01 | 10:46a | 317 | LCIS455__CPY.TXT |
| 01/29/01 | 12:3Sp | 66,733 | LCIS460__CBL.TXT |
| 01/29/01 | 12:35p | 37,261 | LCIS462__CBL.TXT |
| 01/29/01 | 12:35p | 99,936 | LCIS463__CBL.TXT |
| 01/29/01 | 04:01p | 104,294 | RCIS100m.TXT |
| 01/29/01 | 04:02p | 84,216 | RCIS101m.TXT |
| 01/29/01 | 04:02p | 87,439 | RCIS102m.TXT |
| 01/29/01 | 04:26p | 92,074 | RCIS103m.TXT |
| 01/29/01 | 04:26p | 83,317 | RCIS104m.TXT |
| 01/29/01 | 04:26p | 92,933 | RCIS106m.TXT |
| 01/29/01 | 04:26p | 83,164 | RCIS111m.TXT |
| 01/29/01 | 04:34p | 61,274 | RCIS112m.TXT |
| 01/29/01 | 04:26p | 89,756 | RCIS140m.TXT |
| 01/29/01 | 04:26p | 70,581 | RCIS141m.TXT |
| 01/29/01 | 04:26p | 112,220 | RCIS142m.TXT |
| 01/29/01 | 04:27p | 69,415 | RCIS143m.TXT |
| 01/29/01 | 04:34p | 85,294 | RCIS190m.TXT |
| 01/29/01 | 04:34p | 87,768 | RCIS191m.TXT |
| 01/29/01 | 04:34p | 102,190 | RCIS192m.TXT |
| 01/29/01 | 04:34p | 105,248 | RCIS193m.TXT |
| 01/29/01 | 04:34p | 85,497 | RCIS194m.TXT |
| 01/29/01 | 04:34p | 107,615 | RCIS196m.TXT |
| 01/29/01 | 04:34p | 99,720 | RCIS199m.TXT |
| 01/29/01 | 04:28p | 99,722 | RCIS701m.TXT |
| 01/29/01 | 04:34p | 115,070 | RCIS702m.TXT |
| 01/29/01 | 04:29p | 85,799 | RCIS703m.TXT |
| 01/29/01 | 04:34p | 104,168 | RCIS704m.TXT |
| 01/29/01 | 04:29p | 85,717 | RCIS705m.TXT |
| 01/29/01 | 04:34p | 93,370 | RCIS706m.TXT |
| 01/29/01 | 04:29p | 88,711 | RCIS707m.TXT |
| 01/29/01 | 04:34p | 101,296 | RCIS708m.TXT |
| 01/29/01 | 04:29p | 97,929 | RCIS709m.TXT |
| 01/29/01 | 04:34p | 108,786 | RCIS710m.TXT |
| 01/29/01 | 04:29p | 91,554 | RCIS711m.TXT |
| 01/29/01 | 04:34p | 107,841 | RCIS712m.TXT |
| 01/29/01 | 04:29p | 95,314 | RCIS713m.TXT |
| 01/29/01 | 04:34p | 116,846 | RCIS714m.TXT |
| 01/29/01 | 04:29p | 82,667 | RCIS717m.TXT |
| 01/29/01 | 04:34p | 105,771 | RCIS718m.TXT |
| 01/29/01 | 04:31p | 125,556 | RCIS723m.TXT |
| 01/29/01 | 04:34p | 118,032 | RCIS724m.TXT |
| 01/29/01 | 04:31p | 86,801 | RCIS727m.TXT |
| 01/29/01 | 04:34p | 111,967 | RCIS728m.TXT |
| 01/29/01 | 04:31p | 117,336 | RCIS729m.TXT |
| 01/29/01 | 04:34p | 109,443 | RCIS730m.TXT |
| 01/29/01 | 04:30p | 86,482 | RCIS731m.TXT |
| 01/29/01 | 04:34p | 105,040 | RCIS732m.TXT |
| 01/29/01 | 04:34p | 97,329 | RCIS999m.TXT |
| 01/29/01 | 10:39a | 144,095 | SCIS100__CBL.TXT |
| 01/29/01 | 10:53a | 343 | SCIS100__CPY.TXT |
| 01/29/01 | 10:39a | 91,151 | SCIS101__CBL.TXT |
| 01/29/01 | 10:54a | 343 | SCIS101__CPY.TXT |
| 01/29/01 | 10:39a | 90,179 | SCIS102__CBL.TXT |
| 01/29/01 | 10:54a | 349 | SCIS102__CPY.TXT |
| 01/29/01 | 10:39a | 124,449 | SCIS103__CBL.TXT |
| 01/29/01 | 10:54a | 349 | SCIS103__CPY.TXT |
| 01/29/01 | 10:39a | 84,119 | SCIS104__CBL.TXT |
| 01/29/01 | 10:54a | 340 | SCIS104__CPY.TXT |
| 01/29/01 | 10:39a | 140,052 | SCIS106__CBL.TXT |
| 01/29/01 | 10:54a | 346 | SCIS106__CPY.TXT |
| 01/29/01 | 10:39a | 84,012 | SCIS111__CBL.TXT |
| 01/29/01 | 10:54a | 337 | SCIS111__CPY.TXT |
| 01/29/01 | 12:35p | 92,662 | SCIS112__CBL.TXT |

-continued

| | | | |
|---|---|---|---|
| 01/29/01 | 10:39a | 101,417 | SCIS140__CBL.TXT |
| 01/29/01 | 10:54a | 343 | SCIS140__CPY.TXT |
| 01/29/01 | 10:39a | 74,035 | SCIS141__CBL.TXT |
| 01/29/01 | 10:39a | 299,844 | SCIS142__CBL.TXT |
| 01/29/01 | 10:54a | 346 | SCIS142__CPY.TXT |
| 01/29/01 | 12:41p | 87,824 | SCIS143__CBL.TXT |
| 01/29/01 | 10:39a | 118,965 | SCIS190__CBL.TXT |
| 01/29/01 | 10:39a | 126,028 | SCIS191__CBL.TXT |
| 01/29/01 | 10:39a | 140,902 | SCIS192__CBL.TXT |
| 01/29/01 | 10:39a | 136,390 | SCIS193__CBL.TXT |
| 01/29/01 | 10:39a | 118,178 | SCIS194__CBL.TXT |
| 01/29/01 | 10:39a | 146,211 | SCIS196__CBL.TXT |
| 01/29/01 | 10:39a | 124,426 | SCIS199__CBL.TXT |
| 01/29/01 | 10:39a | 169,468 | SCIS701__CBL.TXT |
| 01/29/01 | 10:55a | 346 | SCIS701__CPY.TXT |
| 01/29/01 | 10:39a | 139,090 | SCIS702__CBL.TXT |
| 01/29/01 | 10:40a | 88,998 | SCIS703__CBL.TXT |
| 01/29/01 | 10:55a | 346 | SCIS703__CPY.TXT |
| 01/29/01 | 10:40a | 134,605 | SCIS704__CBL.TXT |
| 01/29/01 | 10:40a | 104,320 | SCIS705__CBL.TXT |
| 01/29/01 | 10:55a | 349 | SCIS705__CPY.TXT |
| 01/29/01 | 10:40a | 124,457 | SCIS706__CBL.TXT |
| 01/29/01 | 10:40a | 91,408 | SCIS707__CBL.TXT |
| 01/29/01 | 10:55a | 349 | SCIS707__CPY.TXT |
| 01/29/01 | 10:40a | 125,202 | SCIS708__CBL.TXT |
| 01/29/01 | 10:40a | 116,165 | SCIS709__CBL.TXT |
| 01/29/01 | 10:55a | 343 | SCIS709__CPY.TXT |
| 01/29/01 | 10:40a | 148,219 | SCIS710__CBL.TXT |
| 01/29/01 | 10:40a | 93,778 | SCIS711__CBL.TXT |
| 01/29/01 | 10:55a | 346 | SCIS711__CPY.TXT |
| 01/29/01 | 10:40a | 126,338 | SCIS712__CBL.TXT |
| 01/29/01 | 10:40a | 214,783 | SCIS713__CBL.TXT |
| 01/29/01 | 10:55a | 675 | SCIS713__CPY.TXT |
| 01/29/01 | 10:40a | 136,369 | SCIS714__CBL.TXT |
| 01/29/01 | 10:40a | 84,799 | SCIS717__CBL.TXT |
| 01/29/01 | 10:56a | 349 | SCIS717__CPY.TXT |
| 01/29/01 | 10:40a | 127,780 | SCIS718__CBL.TXT |
| 01/29/01 | 10:40a | 468,380 | SCIS723__CBL.TXT |
| 01/29/01 | 10:56a | 349 | SCIS723__CPY.TXT |
| 01/29/01 | 10:40a | 186,159 | SCIS724__CBL.TXT |
| 01/29/01 | 10:40a | 238,079 | SCIS727__CBL.TXT |
| 01/29/01 | 10:56a | 349 | SCIS727__CPY.TXT |
| 01/29/01 | 10:40a | 128,803 | SCIS728__CBL.TXT |
| 01/29/01 | 10:40a | 436,585 | SCIS729__CBL.TXT |
| 01/29/01 | 10:56a | 346 | SCIS729__CPY.TXT |
| 01/29/01 | 10:40a | 175,547 | SCIS730__CBL.TXT |
| 01/29/01 | 10:40a | 86,311 | SCIS731__CBL.TXT |
| 01/29/01 | 10:57a | 349 | SCIS731__CPY.TXT |
| 01/29/01 | 10:40a | 127,420 | SCIS732__CBL.TXT |
| 01/29/01 | 10:40a | 144,640 | SCIS999__CBL.TXT |

Directory of D:\M-9381 US\COR

| | | | |
|---|---|---|---|
| 01/31/01 | 03:27p | <DIR> | . |
| 01/31/01 | 03:31p | <DIR> | .. |
| 01/29/01 | 10:41a | 16,105 | BCOR001__CBL.TXT |
| 01/29/01 | 10:41a | 16,691 | BCOR002__CBL.TXT |
| 01/29/01 | 12:29p | 68,108 | BCOR003__CBL.TXT |
| 01/29/01 | 10:39a | 25,942 | ICOR001__CBL.TXT |
| 01/29/01 | 10:52a | 8,372 | ICOR001__CPY.TXT |
| 01/29/01 | 10:39a | 43,927 | ICOR011__CBL.TXT |
| 01/29/01 | 10:52a | 26,969 | ICOR011__CPY.TXT |
| 01/29/01 | 10:39a | 38,679 | ICOR012__CBL.TXT |
| 01/29/01 | 10:52a | 22,122 | ICOR012__CPY.TXT |
| 01/29/01 | 10:39a | 40,805 | ICOR013__CBL.TXT |
| 01/29/01 | 10:52a | 24,879 | ICOR013__CPY.TXT |
| 01/29/01 | 10:39a | 41,479 | ICOR016__CBL.TXT |
| 01/29/01 | 10:52a | 28,351 | ICOR016__CPY.TXT |
| 01/29/01 | 10:39a | 41,295 | ICOR017__CBL.TXT |
| 01/29/01 | 10:52a | 27,875 | ICOR017__CPY.TXT |
| 01/29/01 | 10:39a | 47,559 | ICOR019__CBL.TXT |
| 01/29/01 | 10:53a | 29,279 | ICOR019__CPY.TXT |
| 01/29/01 | 10:39a | 41,090 | ICOR020__CBL.TXT |
| 01/29/01 | 10:53a | 27,139 | ICOR020__CPY.TXT |
| 01/29/01 | 10:39a | 42,011 | ICOR021__CBL.TXT |
| 01/29/01 | 10:53a | 29,334 | ICOR021__CPY.TXT |
| 01/29/01 | 12:35p | 30,078 | ICOR022__CBL.TXT |
| 01/29/01 | 10:53a | 8,651 | ICOR022__CPY.TXT |
| 01/29/01 | 10:39a | 37,393 | ICOR023__CBL.TXT |
| 01/29/01 | 10:53a | 21,514 | ICOR023__CPYTXT |
| 01/29/01 | 10:39a | 64,580 | ICOR025__CBL.TXT |

-continued

| | | |
|---|---|---|
| 01/29/01 | 10:53a | 46,243 ICOR025__CPY.TXT |
| 01/29/01 | 10:39a | 42,068 ICOR028__CBL.TXT |
| 01/29/01 | 10:53a | 29,929 ICOR028__CPY.TXT |
| 01/29/01 | 10:39a | 56,659 ICOR050__CBL.TXT |
| 01/29/01 | 10:53a | 38,833 ICOR050__CPY.TXT |
| 01/29/01 | 10:39a | 54,144 ICOR051__CBL.TXT |
| 01/29/01 | 10:53a | 36,342 ICOR051__CPY.TXT |
| 01/29/01 | 10:39a | 49,390 ICOR052__CBL.TXT |
| 01/29/01 | 10:53a | 32,346 ICOR052__CPY.TXT |
| 01/29/01 | 10:39a | 61,073 ICOR053__CBL.TXT |
| 01/29/01 | 10:53a | 42,464 ICOR053__CPY.TXT |
| 01/29/01 | 10:39a | 49,137 ICOR054__CBL.TXT |
| 01/29/01 | 10:53a | 32,156 ICOR054__CPY.TXT |
| 01/29/01 | 10:39a | 57,354 ICOR055__CBL.TXT |
| 01/29/01 | 10:53a | 39,006 ICOR055__CPY.TXT |
| 01/29/01 | 10:39a | 70,700 ICOR056__CBL.TXT |
| 01/29/01 | 10:53a | 50,684 ICOR056__CPY.TXT |
| 01/29/01 | 10:39a | 49,283 ICOR057__CBL.TXT |
| 01/29/01 | 10:53a | 32,345 ICOR057__CPY.TXT |
| 01/29/01 | 10:39a | 67,585 ICOR058__CBL.TXT |
| 01/29/01 | 10:53a | 48,403 ICOR058__CPY.TXT |
| 01/29/01 | 10:39a | 68,072 ICOR059__CBL.TXT |
| 01/29/01 | 10:53a | 47,277 ICOR059__CPY.TXT |
| 01/29/01 | 12:41p | 79,984 LCOR001__CBL.TXT |
| 01/29/01 | 10:46a | 323 LCOR001__CPY.TXT |
| 01/29/01 | 12:35p | 27,847 LCOR002__CBL.TXT |
| 01/29/01 | 12:36p | 29,319 LCOR003__CBL.TXT |
| 01/29/01 | 12:36p | 33,886 LCOR004__CBL.TXT |
| 01/29/01 | 12:36p | 28,433 LCOR005__CBL.TXT |
| 01/29/01 | 01:35p | 26,328 LC0R006__CBL.TXT |
| 01/29/01 | 12:36p | 23,979 LCOR007__CBL.TXT |
| 01/29/01 | 12:42p | 27,505 LCOR010__CBL.TXT |
| 01/29/01 | 04:30p | 57,676 RCOR000m.TXT |
| 01/29/01 | 04:30p | 53,152 RCOR001m.TXT |
| 01/29/01 | 04:34p | 57,916 RCOR002m.TXT |
| 01/29/01 | 04:34p | 53,337 RCOR007m.TXT |
| 01/29/01 | 04:30p | 92,054 RCOR011m.TXT |
| 01/29/01 | 04:30p | 86,881 RCOR012m.TXT |
| 01/29/01 | 04:30p | 86,596 RCOR013m.TXT |
| 01/29/01 | 04:30p | 82,400 RCOR016m.TXT |
| 01/29/01 | 04:30p | 83,438 RCOR017m.TXT |
| 01/29/01 | 04:30p | 59,213 RCOR018m.TXT |
| 01/29/01 | 04:30p | 100,528 RCOR019m.TXT |
| 01/29/01 | 04:30p | 84,268 RCOR020m.TXT |
| 01/29/01 | 04:30p | 81,747 RCOR021m.TXT |
| 01/29/01 | 04:30p | 81,903 RCOR023m.TXT |
| 01/29/01 | 04:35p | 98,146 RCOR025m.TXT |
| 01/29/01 | 04:30p | 81,155 RCOR028m.TXT |
| 01/29/01 | 04:30p | 46,097 RCOR033m.TXT |
| 01/29/01 | 04:35p | 91,065 RCOR050m.TXT |
| 01/29/01 | 04:35p | 87,584 RCOR051m.TXT |
| 01/29/01 | 04:35p | 80,488 RCOR052m.TXT |
| 01/29/01 | 04:35p | 96,711 RCOR053m.TXT |
| 01/29/01 | 04:35p | 81,410 RCOR054m.TXT |
| 01/29/01 | 04:35p | 92,375 RCOR055m.TXT |
| 01/29/01 | 04:35p | 102,448 RCOR056m.TXT |
| 01/29/01 | 04:35p | 81,376 RCOR057m.TXT |
| 01/29/01 | 04:35p | 104,131 RCOR058m.TXT |
| 01/29/01 | 04:35p | 104,784 RCOR059m.TXT |
| 01/29/01 | 12:42p | 93,661 SCOR000__CBL.TXT |
| 01/29/01 | 10:57a | 348 SCOR000__CPY.TXT |
| 01/29/01 | 12:36p | 86,049 SCOR001__CBL.TXT |
| 01/29/01 | 10:57a | 348 SCOR001__CPY.TXT |
| 01/29/01 | 10:40a | 53,682 SCOR007__CBL.TXT |
| 01/29/01 | 10:40a | 124,142 SCOR011__CBL.TXT |
| 01/29/01 | 10:57a | 349 SCOR011__CPY.TXT |
| 01/29/01 | 10:40a | 87,161 SCOR012__CBL.TXT |
| 01/29/01 | 10:57a | 343 SCOR012__CPY.TXT |
| 01/29/01 | 10:40a | 123,301 SCOR013__CBL.TXT |
| 01/29/01 | 10:57a | 674 SCOR013__CPY.TXT |
| 01/29/01 | 10:40a | 81,407 SCOR016__CBL.TXT |
| 01/29/01 | 10:57a | 349 SCOR016__CPY.TXT |
| 01/29/01 | 10:40a | 80,331 SCOR017__CBL.TXT |
| 01/29/01 | 10:57a | 349 SCOR017__CPY.TXT |
| 01/29/01 | 12:36p | 96,171 SCOR018__CBL.TXT |
| 01/29/01 | 10:41a | 154,792 SCOR019__CBL.TXT |
| 01/29/01 | 10:57a | 346 SCOR019__CPY.TXT |
| 01/29/01 | 10:41a | 81,191 SCOR020__CBL.TXT |
| 01/29/01 | 10:57a | 346 SCOR020__CPY.TXT |

-continued

| | | |
|---|---|---|
| 01/29/01 | 10:41a | 76,854 SCOR021__CBL.TXT |
| 01/29/01 | 10:57a | 346 SCOR021__CPY.TXT |
| 01/29/01 | 10:41a | 62,279 SCOR022__CBL.TXT |
| 01/29/01 | 10:41a | 82,063 SCOR023__CBL.TXT |
| 01/29/01 | 10:57a | 340 SCOR023__CPY.TXT |
| 01/29/01 | 12:36p | 49,752 SCOR024__CBL.TXT |
| 01/29/01 | 10:57a | 348 SCOR024__CPY.TXT |
| 01/29/01 | 10:41a | 126,300 SCOR025__CBL.TXT |
| 01/29/01 | 10:41a | 75,975 SCOR028__CBL.TXT |
| 01/29/01 | 10:58a | 349 SCOR028__CPY.TXT |
| 01/29/01 | 10:41a | 47,512 SCOR029__CBL.TXT |
| 01/29/01 | 12:36p | 47,734 SCOR033__CBL.TXT |
| 01/29/01 | 10:41a | 120,091 SCOR050__CBL.TXT |
| 01/29/01 | 10:41a | 118,238 SCOR051__CBL.TXT |
| 01/29/01 | 10:41a | 194,847 SCOR052__CBL.TXT |
| 01/29/01 | 10:41a | 249,802 SCOR053__CBL.TXT |
| 01/29/01 | 10:41a | 113,857 SC0R054__CBL.TXT |
| 01/29/01 | 10:41a | 122,912 SCOR055__CBL.TXT |
| 01/29/01 | 10:41a | 144,769 SCOR056__CBL.TXT |
| 01/29/01 | 10:41a | 145,415 SCOR057__CBL.TXT |
| 01/29/01 | 10:41a | 154,295 SCOR058__CBL.TXT |
| 01/29/01 | 10:41a | 128,384 SCOR059__CBL.TXT |
| 01/29/01 | 10:41a | 18,359 SCOR099__CBL.TXT |
| Directory of D:\M-9381 US\LIB | | |
| 01/31/01 | 03:27p | <DIR> . |
| 01/31/01 | 03:31p | <DIR> .. |
| 02/13/96 | 12:46p | 514 CPY001__CPY.TXT |
| 11/23/00 | 04:59p | 270 Cpy000__CPY.TXT |
| 01/29/01 | 04:51p | 3,444 Cpy002__CPY.TXT |
| 01/29/01 | 04:51p | 5,685 Cpy003__CPY.TXT |
| 09/30/98 | 04:02p | 4,059 Cpy004__CPY.TXT |
| 09/30/98 | 03:43p | 4,799 Cpy005__CPY.TXT |
| 10/06/00 | 02:21p | 10,347 Libcdecb__CPY.TXT |
| 01/12/01 | 04:05p | 16,444 cpyinv__CPY.TXT |
| 01/12/01 | 04:05p | 786,094 libmsgcb__CPY.TXT |
| 01/12/01 | 04:05p | 61,640 libreccb__CPY.TXT |
| 01/12/01 | 04:05p | 54,510 libwstcb__CPY.TXT |
| Directory of D:\M-9381 US\LXN | | |
| 01/31/01 | 03:27p | <DIR> . |
| 01/31/01 | 03:31p | <DIR> .. |
| 01/29/01 | 10:37a | 46,085 LX0A463__CBL.TXT |
| 01/29/01 | 10:37a | 150,845 LX1A305__CBL.TXT |
| 01/29/01 | 10:37a | 150,845 LX1A309__CBL.TXT |
| 01/29/01 | 10:37a | 127,563 LX1E029__CBL.TXT |
| 01/29/01 | 10:37a | 127,917 LX1E401__CBL.TXT |
| 01/29/01 | 10:37a | 138,405 LX1E404__CBL.TXT |
| 01/29/01 | 10:37a | 56,995 LX1E405__CBL.TXT |
| 01/29/01 | 10:37a | 137,114 LX1E406__CBL.TXT |
| 01/29/01 | 10:37a | 24,698 LX1E407__CBL.TXT |
| 01/29/01 | 10:37a | 269,840 LX1E411__CBL.TXT |
| 01/29/01 | 10:37a | 33,630 LX1E440__CBL.TXT |
| 01/29/01 | 10:37a | 48,859 LX1E441__CBL.TXT |
| 01/29/01 | 10:38a | 36,024 LX1E442__CBL.TXT |
| 01/29/01 | 10:38a | 36,868 LX1E443__CBL.TXT |
| 01/29/01 | 10:38a | 23,375 LX1E444__CBL.TXT |
| 01/29/01 | 10:38a | 165,404 LX1E445__CBL.TXT |
| 01/29/01 | 10:38a | 35,602 LX1E463__CBL.TXT |
| 01/29/01 | 10:38a | 45,930 LX1R404__CBL.TXT |
| 01/29/01 | 10:38a | 23,260 LX1R409__CBL.TXT |
| 01/29/01 | 10:38a | 43,432 LX1R445__CBL.TXT |
| 01/29/01 | 10:38a | 21,443 LX2A305__CBL.TXT |
| 01/29/01 | 10:38a | 21,443 LX2A309__CBL.TXT |
| 01/29/01 | 10:38a | 81,672 LX2E029__CBL.TXT |
| 01/29/01 | 10:38a | 81,527 LX2E401__CBL.TXT |
| 01/29/01 | 10:38a | 97,096 LX2E404__CBL.TXT |
| 01/29/01 | 10:38a | 38,786 LX2E405__CBL.TXT |
| 01/29/01 | 10:38a | 89,480 LX2E406__CBL.TXT |
| 01/29/01 | 10:38a | 24,608 LX2E407__CBL.TXT |
| 01/29/01 | 10:38a | 165,091 LX2E411__CBL.TXT |
| 01/29/01 | 10:38a | 24,187 LX2E440__CBL.TXT |
| 01/29/01 | 10:38a | 73,667 LX2E441__CBL.TXT |
| 01/29/01 | 10:38a | 27,125 LX2E442__CBL.TXT |
| 01/29/01 | 10:38a | 26,856 LX2E443__CBL.TXT |
| 01/29/01 | 10:38a | 20,100 LX2E444__CBL.TXT |
| 01/29/01 | 10:38a | 110,268 LX2E445__CBL.TXT |
| 01/29/01 | 10:38a | 26,421 LX2E463__CBL.TXT |
| 01/29/01 | 10:38a | 22,323 LX3A305__CBL.TXT |
| 01/29/01 | 10:38a | 22,323 LX3A309 CBL.TXT |
| 01/29/01 | 10:38a | 29,944 LX4A305__CBL.TXT |

-continued

| | | | |
|---|---|---|---|
| 01/29/01 | 10:38a | 29,944 | LX4A309__CBL.TXT |
| 01/29/01 | 10:38a | 19,684 | LX5A305__CBL.TXT |
| 01/29/01 | 10:38a | 19,684 | LX5A309__CBL.TXT |
| Directory of D:\M-9381 US\MFS | | | |
| 01/31/01 | 03:28p | <DIR> | . |
| 01/31/01 | 03:31p | <DIR> | .. |
| 01/29/01 | 10:41a | 222 | ZABEND1__CBL.TXT |
| 01/29/01 | 10:41a | 6,631 | ZCALLSV__CBL.TXT |
| 01/29/01 | 10:41a | 1,077 | ZCBLERR__CBL.TXT |
| 01/29/01 | 10:41a | 4,857 | ZCONECT__CBL.TXT |
| 01/29/01 | 10:41a | 5,291 | ZCRERPT__CBL.TXT |
| 01/29/01 | 10:41a | 276 | ZDEBUG1__CBL.TXT |
| 01/29/01 | 10:41a | 393 | ZDEBUG2__CBL.TXT |
| 01/29/01 | 10:41a | 1,728 | ZDISCON__CBL.TXT |
| 01/29/01 | 10:41a | 1,041 | ZGETTXT__CBL.TXT |
| 01/29/01 | 10:41a | 6,932 | ZINIINP__CBL.TXT |
| 01/29/01 | 10:41a | 891 | ZINTJUL__CBL.TXT |
| 01/29/01 | 10:41a | 2,153 | ZINTTME__CBL.TXT |
| 01/29/01 | 10:41a | 829 | ZJULDAY__CBL.TXT |
| 01/29/01 | 10:41a | 624 | ZJULDYN__CBL.TXT |
| 01/29/01 | 10:41a | 1,479 | ZJULSTM__CBL.TXT |
| 01/29/01 | 10:41a | 1,562 | ZJULTME__CBL.TXT |
| 01/29/01 | 10:41a | 5,953 | ZLEVENT__CBL.TXT |
| 01/29/01 | 10:41a | 698 | ZOLE001__CBL.TXT |
| 01/29/01 | 10:41a | 1,691 | ZOLE002__CBL.TXT |
| 01/29/01 | 10:41a | 696 | ZOLE100__CBL.TXT |
| 01/29/01 | 10:41a | 696 | ZOLE101__CBL.TXT |
| 01/29/01 | 10:41a | 696 | ZOLE102__CBL.TXT |
| 01/29/01 | 10:41a | 696 | ZOLE103__CBL.TXT |
| 01/29/01 | 10:41a | 696 | ZOLE104__CBL.TXT |
| 01/29/01 | 10:41a | 696 | ZOLE105__CBL.TXT |
| 01/29/01 | 10:41a | 696 | ZOLE106__CBL.TXT |
| 01/29/01 | 10:41a | 696 | ZOLE107__CBL.TXT |
| 01/29/01 | 10:41a | 696 | ZOLE108__CBL.TXT |
| 01/29/01 | 10:41a | 696 | ZOLE109__CBL.TXT |
| 01/29/01 | 10:41a | 133,143 | ZPREPRC__CBL.TXT |
| 01/29/01 | 10:41a | 1,772 | ZSQLERR__CBL.TXT |
| 01/29/01 | 10:41a | 1,198 | ZTIME01__CBL.TXT |
| 01/29/01 | 10:41a | 1,769 | ZTJULDY__CBL.TXT |
| 01/29/01 | 10:41a | 2,111 | ZTMFTRN__CBL.TXT |
| 01/29/01 | 10:41a | 1,090 | ZTRG001__CBL.TXT |
| 01/29/01 | 10:41a | 492 | ZTRG002__CBL.TXT |
| Directory of D:\M-9381 US\MSC | | | |
| 01/31/01 | 03:30p | <DIR> | . |
| 01/31/01 | 03:31p | <DIR> | .. |
| 01/29/01 | 12:25p | 53,642 | BMSC201__CBL.TXT |
| 01/29/01 | 12:25p | 130,025 | BMSC230__CBL.TXT |
| 01/29/01 | 10:59a | 977 | BMSC230__CPY.TXT |
| 01/29/01 | 12:25p | 133,301 | BMSC262__CBL.TXT |
| 01/29/01 | 10:59a | 982 | BMSC262__CPY.TXT |
| 01/29/01 | 01:35p | 113,486 | BMSC263__CBL.TXT |
| 01/29/01 | 10:59a | 330 | BMSC263__CPY.TXT |
| 01/29/01 | 12:25p | 154,552 | BMSC267__CBL.TXT |
| 01/29/01 | 10:59a | 1,308 | BMSC267__CPY.TXT |
| 01/29/01 | 12:25p | 134,918 | BMSC275__CBL.TXT |
| 01/29/01 | 10:59a | 977 | BMSC275__CPY.TXT |
| 01/29/01 | 12:26p | 153,076 | BMSC276__CBL.TXT |
| 01/29/01 | 10:59a | 1,305 | BMSC276__CPY.TXT |
| 01/29/01 | 12:26p | 106,890 | BMSC300__CBL.TXT |
| 01/29/01 | 11:00a | 330 | BMSC300__CPY.TXT |
| 01/29/01 | 12:26p | 104,861 | BMSC301__CBL.TXT |
| 01/29/01 | 11:00a | 330 | BMSC301__CPY.TXT |
| 01/29/01 | 12:37p | 171,201 | BMSC350__CBL.TXT |
| 01/29/01 | 11:00a | 330 | BMSC350__CPY.TXT |
| 01/29/01 | 12:26p | 128,125 | BMSC351__CBL.TXT |
| 01/29/01 | 11:00a | 330 | BMSC351__CPY.TXT |
| 01/29/01 | 12:26p | 132,623 | BMSC352__CBL.TXT |
| 01/29/01 | 11:00a | 979 | BMSC352__CPY.TXT |
| 01/29/01 | 12:26p | 375,914 | BMSC359__CBL.TXT |
| 01/29/01 | 11:00a | 2,271 | BMSC359__CPY.TXT |
| 01/29/01 | 12:43p | 171,267 | BMSC360__CBL.TXT |
| 01/29/01 | 11:00a | 330 | BMSC360__CPY.TXT |
| 01/29/01 | 12:43p | 143,913 | BMSC370__CBL.TXT |
| 01/29/01 | 11:00a | 330 | BMSC370__CPY.TXT |
| 01/29/01 | 12:27p | 130,614 | BMSC373__CBL.TXT |
| 01/29/01 | 11:00a | 330 | BMSC373__CPY.TXT |
| 01/29/01 | 12:27p | 109,484 | BMSC375__CBL.TXT |
| 01/29/01 | 11:00a | 330 | BMSC375__CPY.TXT |
| 01/29/01 | 12:27p | 109,876 | BMSC376__CBL.TXT |

-continued

| | | | |
|---|---|---|---|
| 01/29/01 | 11:00a | 330 | BMSC376__CPY.TXT |
| 01/29/01 | 12:27p | 131,522 | BMSC382__CBL.TXT |
| 01/29/01 | 11:00a | 330 | BMSC382__CPY.TXT |
| 01/29/01 | 12:27p | 134,514 | BMSC383__CBL.TXT |
| 01/29/01 | 11:00a | 330 | BMSC383__CPY.TXT |
| 01/29/01 | 12:27p | 124,580 | BMSC385__CBL.TXT |
| 01/29/01 | 11:00a | 1,300 | BMSC385__CPY.TXT |
| 01/29/01 | 12:27p | 124,591 | BMSC394__CBL.TXT |
| 01/29/01 | 11:00a | 330 | BMSC394__CPY.TXT |
| 01/29/01 | 12:15p | 130,966 | BMSC398__CBL.TXT |
| 01/29/01 | 11:00a | 330 | BMSC398__CPY.TXT |
| 01/29/01 | 12:44p | 124,467 | BMSC518__CBL.TXT |
| 01/29/01 | 11:00a | 330 | BMSC518__CPY.TXT |
| 01/29/01 | 12:44p | 111,287 | BMSC592__CBL.TXT |
| 01/29/01 | 11:00a | 330 | BMSC592__CPY.TXT |
| 01/29/01 | 12:44p | 193,976 | BMSC602__CBL.TXT |
| 01/29/01 | 11:00a | 1,302 | BMSC602__CPY.TXT |
| 01/29/01 | 12:44p | 130,254 | BMSC603__CBL.TXT |
| 01/29/01 | 11:00a | 330 | BMSC603__CPY.TXT |
| 01/29/01 | 12:14p | 138,846 | BMSC604__CBL.TXT |
| 01/29/01 | 11:01a | 330 | BMSC604__CPY.TXT |
| 01/29/01 | 12:28p | 117,263 | BMSC605__CBL.TXT |
| 01/29/01 | 11:01a | 330 | BMSC605__CPY.TXT |
| 01/29/01 | 12:27p | 328,668 | BMSC606__CBL.TXT |
| 01/29/01 | 11:01a | 330 | BMSC606__CPY.TXT |
| 01/29/01 | 12:15p | 101,418 | BMSC607__CBL.TXT |
| 01/29/01 | 11:01a | 330 | BMSC607__CPY.TXT |
| 01/29/01 | 10:39a | 73,803 | IMSC301__CBL.TXT |
| 01/29/01 | 10:53a | 46,777 | IMSC301__CPY.TXT |
| 01/29/01 | 10:39a | 23,449 | IMSC302__CBL.TXT |
| 01/29/01 | 10:53a | 8,159 | IMSC302__CPY.TXT |
| 01/29/01 | 10:39a | 30,221 | IMSC303__CBL.TXT |
| 01/29/01 | 10:53a | 14,128 | IMSC303__CPY.TXT |
| 01/29/01 | 10:39a | 62,937 | IMSC304__CBL.TXT |
| 01/29/01 | 10:53a | 40,417 | IMSC304__CPY.TXT |
| 01/29/01 | 10:39a | 35,204 | IMSC305__CBL.TXT |
| 01/29/01 | 10:53a | 18,042 | IMSC305__CPY.TXT |
| 01/29/01 | 10:39a | 42,240 | IMSC306__CBL.TXT |
| 01/29/01 | 10:53a | 27,845 | IMSC306__CPY.TXT |
| 01/29/01 | 10:39a | 54,964 | IMSC308__CBL.TXT |
| 01/29/01 | 10:53a | 36,148 | IMSC308__CPY.TXT |
| 01/29/01 | 10:39a | 61,996 | IMSC310__CBL.TXT |
| 01/29/01 | 10:53a | 40,517 | IMSC310__CPY.TXT |
| 01/29/01 | 04:44p | 359,347 | LMSC305__CBL.TXT |
| 01/29/01 | 04:44p | 359,429 | LMSC309__CBL.TXT |
| 01/29/01 | 04:52p | 210,026 | LMSC350__CBL.TXT |
| 01/29/01 | 12:46p | 114,054 | LMSC351__CBL.TXT |
| 01/29/01 | 10:47a | 2,610 | LMSC351__CPY.TXT |
| 01/29/01 | 01:37p | 101,195 | LMSC360__CBL.TXT |
| 01/29/01 | 12:37p | 168,284 | LMSC600__CBL.TXT |
| 01/29/01 | 04:44p | 23,909 | LMSC602__CBL.TXT |
| 01/29/01 | 12:37p | 28,016 | LMSC603__CBL.TXT |
| 01/29/01 | 12:38p | 33,163 | LMSC604__CBL.TXT |
| 01/29/01 | 12:38p | 22,464 | LMSC605__CBL.TXT |
| 01/29/01 | 12:38p | 21,301 | LMSC606__CBL.TXT |
| 01/29/01 | 12:38p | 144,338 | LMSC607__CBL.TXT |
| 01/29/01 | 04:44p | 111,911 | RMSC301m.TXT |
| 01/29/01 | 04:44p | 47,627 | RMSC302m.TXT |
| 01/29/01 | 04:44p | 65,115 | RMSC303m.TXT |
| 01/29/01 | 04:44p | 88,736 | RMSC304m.TXT |
| 01/29/01 | 04:35p | 59,224 | RMSC305m.TXT |
| 01/29/01 | 04:44p | 68,814 | RMSC306m.TXT |
| 01/29/01 | 04:44p | 97,072 | RMSC308m.TXT |
| 01/29/01 | 12:38p | 223,681 | SMSC301__CBL.TXT |
| 01/29/01 | 10:58a | 675 | SMSC301__CPY.TXT |
| 01/29/01 | 12:38p | 89,057 | SMSC302__CBL.TXT |
| 01/29/01 | 10:58a | 675 | SMSC302__CPY.TXT |
| 01/29/01 | 04:44p | 129,411 | SMSC303__CBL.TXT |
| 01/29/01 | 12:38p | 250,088 | SMSC304__CBL.TXT |
| 01/29/01 | 10:59a | 672 | SMSC304__CPY.TXT |
| 01/29/01 | 04:44p | 57,109 | SMSC305__CBL.TXT |
| 01/29/01 | 12:38p | 197,292 | SMSC306__CBL.TXT |
| 01/29/01 | 12:38p | 284,622 | SMSC308__CBL.TXT |
| 01/29/01 | 10:59a | 1,641 | SMSC308__CPY.TXT |
| 01/29/01 | 04:44p | 57,109 | SMSC309__CBL.TXT |
| 01/29/01 | 12:38p | 147,371 | SMSC310__CBL.TXT |
| 01/29/01 | 10:59a | 996 | SMSC310__CPY.TXT |
| Directory of D:\M-9381 US\SCRIPTS | | | |
| 01/31/01 | 03:30p | <DIR> | . |

-continued

| | | | |
|---|---|---|---|
| 01/31/01 | 03:31p | <DIR> | .. |
| 11/28/00 | 11:44a | | 14,383 Fstdev__SCP.TXT |
| 01/29/01 | 10:35a | | 275,599 LNT__DEMO__SCP.TXT |
| 01/29/01 | 10:35a | | 83,059 LNT__OPS__SCP.TXT |
| 01/29/01 | 10:35a | | 67,790 LNT__USER__SCP.TXT |
| 01/29/01 | 10:35a | | 149,283 Lnt__advanced__SCP.TXT |
| 01/29/01 | 10:35a | | 280,531 Lnt__regntest__SCP.TXT |
| 01/29/01 | 10:35a | | 46,957 Lnt__security__SCP.TXT |
| 01/29/01 | 10:35a | | 285,104 Lnt__super__SCP.TXT |
| 01/29/01 | 10:35a | | 15,897 NSK__OPS__SCP.TXT |
| 01/29/01 | 10:35a | | 9,682 NSK__USER__SCP.TXT |
| 01/29/01 | 10:35a | | 35,944 Nsk__advanced__SCP.TXT |
| 01/29/01 | 10:35a | | 53,921 Nsk__regntest__SCP.TXT |
| 01/29/01 | 10:35a | | 4,024 Nsk__security__SCP.TXT |
| 01/29/01 | 10:35a | | 56,196 Nsk__super__SCP.TXT |
| 10/24/00 | 08:24a | | 43,345 Pccase__SCP.TXT |
| 01/29/01 | 10:35a | | 85,214 RNT__OPS__SCP.TXT |
| 01/29/01 | 10:35a | | 69,866 RNT__USER__SCP.TXT |
| 01/29/01 | 10:35a | | 151,510 Rnt__advanced__SCP.TXT |
| 01/29/01 | 10:35a | | 282,853 Rnt__regntest__SCP.TXT |
| 01/29/01 | 10:35a | | 49,010 Rnt__security__SCP.TXT |
| 01/29/01 | 10:35a | | 287,425 Rnt__super__SCP.TXT |

Directory of D:\M-9381 US\SQL

| | | | |
|---|---|---|---|
| 01/31/01 | 03:31p | <DIR> | . |
| 01/31/01 | 03:31p | <DIR> | .. |
| 11/24/00 | 06:24p | | 3,616 Currency__Ref__Integ__Check__Execs__sql.txt |
| 05/13/99 | 05:12p | | 993 Relate__Markets__To__Std__PriceHdrs__sql.txt |
| 05/13/99 | 02:38p | | 2,297 Service__Ref__Integ__Check__Execs__sql.txt |
| 12/22/00 | 10:18a | | 114,758 create__all__procs__sql.txt |
| 01/11/01 | 03:57p | | 302,536 create__all__tables__sql.txt |

Directory of D:\M-9381 US\WEBAPP

| | | | |
|---|---|---|---|
| 01/31/01 | 03:35p | <DIR> | . |
| 01/31/01 | 03:31p | <DIR> | .. |
| 01/31/01 | 03:33p | <DIR> | FUNCS |
| 04/30/99 | 05:38p | | 1,582 Fstgwy__asp.txt |
| 01/31/01 | 03:33p | <DIR> | GENERAL |
| 06/13/00 | 01:33p | | 972 Index__htm.txt |
| 01/31/01 | 03:33p | <DIR> | SCRIPTS |
| 01/31/01 | 03:34p | <DIR> | SCRNS |
| 01/31/01 | 03:35p | <DIR> | STYLES |

Directory of D:\M-9381 US\WEBAPP\FUNCS

| | | | |
|---|---|---|---|
| 01/31/01 | 03:33p | <DIR> | . |
| 01/31/01 | 03:35p | <DIR> | .. |
| 01/29/01 | 11:20a | | 836 FUNC001__ASP.TXT |
| 01/29/01 | 11:20a | | 966 FUNC012__ASP.TXT |
| 01/29/01 | 11:20a | | 845 FUNC014__ASP.TXT |
| 01/29/01 | 11:20a | | 955 FUNC016__ASP.TXT |
| 01/29/01 | 11:20a | | 955 FUNC017__ASP.TXT |
| 01/29/01 | 11:20a | | 855 FUNC019__ASP.TXT |
| 01/29/01 | 11:20a | | 958 FUNC020__ASP.TXT |
| 01/29/01 | 11:20a | | 964 FUNC022__ASP.TXT |
| 01/29/01 | 11:20a | | 951 FUNC023__ASP.TXT |
| 01/29/01 | 11:20a | | 961 FUNC024__ASP.TXT |
| 01/29/01 | 11:20a | | 954 FUNC025__ASP.TXT |
| 01/29/01 | 11:20a | | 962 FUNC026__ASP.TXT |
| 01/29/01 | 11:20a | | 960 FUNC028__ASP.TXT |
| 01/29/01 | 11:20a | | 963 FUNC050__ASP.TXT |
| 01/29/01 | 11:20a | | 859 FUNC053__ASP.TXT |
| 01/29/01 | 11:20a | | 969 FUNC054__ASP.TXT |
| 01/29/01 | 11:20a | | 843 FUNC055__ASP.TXT |
| 01/29/01 | 11:20a | | 854 FUNC056__ASP.TXT |
| 01/29/01 | 11:20a | | 966 FUNC057__ASP.TXT |
| 01/29/01 | 11:20a | | 965 FUNC070__ASP.TXT |
| 01/29/01 | 11:20a | | 965 FUNC071__ASP.TXT |
| 01/29/01 | 11:20a | | 973 FUNC072__ASP.TXT |
| 01/29/01 | 11:20a | | 973 FUNC073__ASP.TXT |
| 01/29/01 | 11:20a | | 970 FUNC074__ASP.TXT |
| 01/29/01 | 11:20a | | 968 FUNC075__ASP.TXT |
| 01/29/01 | 11:20a | | 964 FUNC076__ASP.TXT |
| 01/29/01 | 11:20a | | 974 FUNC077__ASP.TXT |
| 01/29/01 | 11:20a | | 977 FUNC078__ASP.TXT |
| 01/29/01 | 11:20a | | 976 FUNC079__ASP.TXT |
| 01/29/01 | 11:20a | | 954 FUNC103__ASP.TXT |
| 01/29/01 | 11:20a | | 960 FUNC104__ASP.TXT |
| 01/29/01 | 11:20a | | 953 FUNC106__ASP.TXT |
| 01/29/01 | 11:20a | | 951 FUNC107__ASP.TXT |
| 01/29/01 | 11:20a | | 949 FUNC114__ASP.TXT |
| 01/29/01 | 11:20a | | 962 FUNC115__ASP.TXT |
| 01/29/01 | 11:20a | | 952 FUNC116__ASP.TXT |

-continued

| | | | |
|---|---|---|---|
| 01/29/01 | 11:20a | | 953 FUNC117__ASP.TXT |
| 01/29/01 | 11:20a | | 852 FUNC118__ASP.TXT |
| 01/29/01 | 11:20a | | 964 FUNC121__ASP.TXT |
| 01/29/01 | 11:20a | | 970 FUNC122__ASP.TXT |
| 01/29/01 | 11:20a | | 963 FUNC123__ASP.TXT |
| 01/29/01 | 11:20a | | 961 FUNC124__ASP.TXT |
| 01/29/01 | 11:20a | | 959 FUNC126__ASP.TXT |
| 01/29/01 | 11:20a | | 972 FUNC127__ASP.TXT |
| 01/29/01 | 11:20a | | 962 FUNC128__ASP.TXT |
| 01/29/01 | 11:20a | | 963 FUNC129__ASP.TXT |
| 01/29/01 | 11:20a | | 971 FUNC191__ASP.TXT |
| 01/29/01 | 11:20a | | 967 FUNC192__ASP.TXT |
| 01/29/01 | 11:20a | | 972 FUNC193__ASP.TXT |
| 01/29/01 | 11:20a | | 967 FUNC194__ASP.TXT |
| 01/29/01 | 11:20a | | 977 FUNC195__ASP.TXT |
| 09/28/00 | 10:23a | | 847 FUNC310__ASP.TXT |
| 01/29/01 | 11:20a | | 861 FUNC702__ASP.TXT |
| 01/29/01 | 11:20a | | 867 FUNC703__ASP.TXT |
| 01/29/01 | 11:20a | | 859 FUNC704__ASP.TXT |
| 01/29/01 | 11:20a | | 953 FUNC706__ASP.TXT |
| 01/29/01 | 11:20a | | 969 FUNC707__ASP.TXT |
| 01/29/01 | 11:20a | | 847 FUNC708__ASP.TXT |
| 01/29/01 | 11:20a | | 849 FUNC709__ASP.TXT |
| 01/29/01 | 11:20a | | 852 FUNC710__ASP.TXT |
| 01/29/01 | 11:20a | | 846 FUNC711__ASP.TXT |
| 01/29/01 | 11:20a | | 969 FUNC712__ASP.TXT |
| 01/29/01 | 11:20a | | 957 FUNC713__ASP.TXT |
| 01/29/01 | 11:20a | | 967 FUNC714__ASP.TXT |
| 01/29/01 | 11:20a | | 957 FUNC715__ASP.TXT |
| 01/29/01 | 11:20a | | 977 FUNC722__ASP.TXT |
| 01/29/01 | 11:20a | | 963 FUNC723__ASP.TXT |
| 01/29/01 | 11:20a | | 977 FUNC724__ASP.TXT |
| 01/29/01 | 11:20a | | 966 FUNC725__ASP.TXT |
| 01/29/01 | 11:20a | | 968 FUNC726__ASP.TXT |
| 01/29/01 | 11:20a | | 971 FUNC727__ASP.TXT |
| 01/29/01 | 11:20a | | 978 FUNC729__ASP.TXT |
| 01/29/01 | 11:20a | | 965 FUNC730__ASP.TXT |
| 01/29/01 | 11:20a | | 971 FUNC731__ASP.TXT |
| 01/29/01 | 11:20a | | 967 FUNC732__ASP.TXT |
| 01/29/01 | 11:20a | | 964 FUNC733__ASP.TXT |
| 01/29/01 | 11:20a | | 967 FUNC734__ASP.TXT |
| 01/29/01 | 11:20a | | 862 FUNC741__ASP.TXT |
| 01/29/01 | 11:20a | | 868 FUNC742__ASP.TXT |
| 01/29/01 | 11:20a | | 858 FUNC743__ASP.TXT |
| 01/29/01 | 11:20a | | 860 FUNC744__ASP.TXT |
| 01/29/01 | 11:20a | | 863 FUNC745__ASP.TXT |
| 01/29/01 | 11:20a | | 860 FUNC746__ASP.TXT |
| 01/29/01 | 11:20a | | 866 FUNC747__ASP.TXT |
| 01/29/01 | 11:20a | | 856 FUNC748__ASP.TXT |
| 01/29/01 | 11:20a | | 858 FUNC749__ASP.TXT |
| 01/29/01 | 11:20a | | 861 FUNC750__ASP.TXT |
| 01/29/01 | 11:20a | | 861 FUNC751__ASP.TXT |
| 01/29/01 | 11:20a | | 857 FUNC752__ASP.TXT |
| 01/29/01 | 11:20a | | 858 FUNC753__ASP.TXT |
| 01/29/01 | 11:20a | | 856 FUNC754__ASP.TXT |
| 01/29/01 | 11:20a | | 857 FUNC755__ASP.TXT |
| 01/29/01 | 11:20a | | 846 FUNC764__ASP.TXT |
| 01/29/01 | 11:20a | | 846 FUNC765__ASP.TXT |
| 01/29/01 | 11:20a | | 848 FUNC766__ASP.TXT |
| 01/29/01 | 11:20a | | 866 FUNC801__ASP.TXT |
| 01/29/01 | 11:20a | | 869 FUNC802__ASP.TXT |
| 01/29/01 | 11:20a | | 869 FUNC803__ASP.TXT |
| 01/29/01 | 11:20a | | 861 FUNC804__ASP.TXT |
| 01/29/01 | 11:20a | | 864 FUNC805__ASP.TXT |
| 01/29/01 | 11:20a | | 868 FUNC806__ASP.TXT |
| 01/29/01 | 11:20a | | 867 FUNC807__ASP.TXT |
| 01/29/01 | 11:20a | | 859 FUNC808__ASP.TXT |
| 01/29/01 | 11:20a | | 975 FUNC809__ASP.TXT |
| 01/29/01 | 11:20a | | 978 FUNC810__ASP.TXT |
| 01/29/01 | 11:20a | | 978 FUNC811__ASP.TXT |
| 01/29/01 | 11:20a | | 969 FUNC812__ASP.TXT |
| 01/29/01 | 11:20a | | 970 FUNC813__ASP.TXT |
| 01/29/01 | 11:20a | | 865 FUNC814__ASP.TXT |
| 01/29/01 | 11:20a | | 867 FUNC815__ASP.TXT |
| 01/29/01 | 11:20a | | 862 FUNC816__ASP.TXT |
| 01/29/01 | 11:20a | | 869 FUNC817__ASP.TXT |
| 01/29/01 | 11:20a | | 868 FUNC818__ASP.TXT |
| 01/29/01 | 11:20a | | 859 FUNC819__ASP.TXT |
| 01/29/01 | 11:20a | | 860 FUNC820__ASP.TXT |

-continued

```
01/29/01  11:20a              961 FUNC899__ASP.TXT
Directory of D:\M-9381 US\WEBAPP\GENERAL
01/31/01  03:33p   <DIR>  .
01/31/01  03:35p   <DIR>  ..
06/17/99  02:09p            5,428 Implicit__asp.txt
06/15/99  01:47p              532 LGNERR__asp.txt
05/19/00  03:56p           11,056 Splash__asp.txt
05/18/00  12:37p            4,554 copyright__htm.txt
12/05/00  06:38p           15,911 counter__htm.txt
05/19/00  11:25a            1,798 intranetdenied__htm.txt
12/05/00  05:13p            4,059 intranethomepage__asp.txt
05/49/00  11:25a            1,913 intranetieonly__htm.txt
07/06/00  02:24p            3,764 logon__asp.txt
01/29/01  11:20a           16,715 menu__asp.txt
05/08/00  02:59p            2,621 preload__htm.txt
Directory of D:\M-9381 US\WEBAPP\SCRIPTS
01/31/01  03:33p   <DIR>  .
01/31/01  03:35p   <DIR>  ..
11/20/00  11:43a            6,937 DTL01__SCP.TXT
11/20/00  01:29p           27,297 DTL02__SCP.TXT
06/22/99  11:23a            5,381 DTL03__SCP.TXT
09/18/00  03:28p              210 DTL11__SCP.TXT
09/29/00  11:02a            6,528 DTL12__SCP.TXT
10/12/00  05:03p           10,462 DTL21__INC.TXT
07/30/99  10:37a              577 access__inc.txt
10/12/00  02:02p              536 applid__js.txt
10/12/00  02:02p              525 applid__scp.txt
06/22/99  10:41a              852 brzlib__js.txt
03/26/99  03:59p              400 dtlmnu__scp.txt
01/29/01  11:20a           19,869 function__scp.txt
06/15/99  01:51p            4,389 general__scp.txt
06/24/99  10:46p              620 jetest__inc.txt
01/29/01  11:20a            2,087 implicit__scp.txt
07/06/00  09:17a            4,815 intranetlogon__inc.txt
10/05/00  10:26a            1,005 intranetlogon__lst.txt
06/15/99  01:52p              206 parkingspot__scp.txt
06/07/99  10:29a              318 preload__scp.txt
Directory of D:\M-9381 US\WEBAPP\SCRNS
01/31/010 03:34p   <DIR>  .
01/31/010 03:35p   <DIR>  ..
01/29/01  11:20a            2,258 scrn000__HTM.TXT
01/29/01  11:20a            4,135 scrn001__HTM.TXT
01/29/01  11:20a            6,757 scrn002__HTM.TXT
01/29/01  11:20a            7,939 scrn007__HTM.TXT
01/29/01  11:20a           52,553 scrn011__HTM.TXT
01/29/01  11:20a           12,476 scrn012__HTM.TXT
01/29/01  11:20a           17,576 scrn013__HTM.TXT
01/29/01  11:20a           20,842 scrn016__HTM.TXT
01/29/01  11:20a           21,439 scrn017__HTM.TXT
01/29/01  11:20a           10,351 scrn018__HTM.TXT
01/29/01  11:20a           18,712 scrn019__HTM.TXT
01/29/01  11:20a           12,248 scrn020__HTM.TXT
01/29/01  11:20a           10,854 scrn021__HTM.TXT
01/29/01  11:20a           10,674 scrn023__HTM.TXT
01/29/01  11:20a           32,207 scrn025__HTM.TXT
01/29/01  11:20a           10,632 scrn028__HTM.TXT
01/29/01  11:20a            2,009 scrn033__HTM.TXT
01/29/01  11:20a           24,463 scrn050__HTM.TXT
01/29/01  11:20a           21,983 scrn051__HTM.TXT
01/29/01  11:20a           16,599 scrn052__HTM.TXT
01/29/01  11:20a           28,906 scrn053__HTM.TXT
01/29/01  11:20a           17,165 scrn054__HTM.TXT
01/29/01  11:20a           25,259 scrn055__HTM.TXT
01/29/01  11:20a           35,997 scrn056__HTM.TXT
01/29/01  11:20a           16,983 scrn057__HTM.TXT
01/29/01  11:20a           35,344 scrn058__HTM.TXT
01/29/01  11:20a           35,295 scrn059__HTM.TXT
01/29/01  11:20a           27,793 scrn100__HTM.TXT
01/29/01  11:20a           13,821 scrn101__HTM.TXT
01/29/01  11:20a           15,876 scrn102__HTM.TXT
01/29/01  11:20a          102,399 scrn103__HTM.TXT
01/29/01  11:20a           13,165 scrn104__HTM.TXT
01/29/01  11:20a           24,506 scrn106__HTM.TXT
01/29/01  11:20a           12,292 scrn111__HTM.TXT
01/29/01  11:20a           15,028 scrn112__HTM.TXT
01/29/01  11:20a           17,741 scrn140__HTM.TXT
01/29/01  11:20a            9,836 scrn141__HTM.TXT
01/29/01  11:20a           40,463 scrn142__HTM.TXT
01/29/01  11:20a           13,301 scrn143__HTM.TXT
```

-continued

```
01/29/01  11:20a            9,975 scrn186__HTM.TXT
01/29/01  11:20a           20,287 scrn190__HTM.TXT
01/29/01  11:20a           22,630 scrn191__HTM.TXT
01/29/01  11:20a           36,172 scrn192__HTM.TXT
01/29/01  11:20a          118,630 scrn193__HTM.TXT
01/29/01  1 1:20a          20,610 scrn194__HTM.TXT
01/29/01  11:20a           42,586 scrn196__HTM.TXT
01/29/01  11:20a           31,063 scrn199__HTM.TXT
01/29/01  11:20a           42,613 scrn301__HTM.TXT
01/29/01  11:20a            5,059 scrn302__HTM.TXT
01/29/01  11:20a           15,551 scrn303__HTM.TXT
01/29/01  11:20a           51,827 scrn304__HTM.TXT
01/29/01  11:20a           24,470 scrn305__HTM.TXT
01/29/01  11:20a           27,070 scrn306__HTM.TXT
01/29/01  11:20a           46,332 scrn308__HTM.TXT
01/29/01  11:20a           53,218 scrn310__HTM.TXT
01/29/01  11:20a           30,568 scrn701__HTM.TXT
01/29/01  11:20a           45,497 scrn702__HTM.TXT
01/29/01  11:20a           19,933 scrn703__HTM.TXT
01/29/01  11:20a           39,375 scrn704__HTM.TXT
01/29/01  11:20a           16,408 scrn705__HTM.TXT
01/29/01  11:20a           27,433 scrn706__HTM.TXT
01/29/01  11:20a           21,786 scrn707__HTM.TXT
01/29/01  11:20a           36,503 scrn708__HTM.TXT
01/29/01  11:20a           29,499 scrn709__HTM.TXT
01/29/01  11:20a           44,583 scrn710__HTM.TXT
01/29/01  11:20a           18,586 scrn711__HTM.TXT
01/29/01  11:20a           36,156 scrn712__HTM.TXT
01/29/01  11:20a           23,476 scrn713__HTM.TXT
01/29/01  11:20a           47,967 scrn714__HTM.TXT
01/29/01  11:20a           10,842 scrn717__HTM.TXT
01/29/01  11:20a           39,203 scrn718__HTM.TXT
01/29/01  11:20a           49,165 scrn723__HTM.TXT
01/29/01  11:20a           51,030 scrn724__HTM.TXT
01/29/01  11:20a           26,405 scrn727__HTM.TXT
01/29/01  11:20a           55,914 scrn728__HTM.TXT
01/29/01  11:20a           49,670 scrn729__HTM.TXT
01/29/01  11:20a           50,601 scrn730__HTM.TXT
01/29/01  11:20a           24,118 scrn731__HTM.TXT
01/29/01  11:20a           40,247 scrn732__HTM.TXT
01/29/01  11:20a            2,858 scrn901__HTM.TXT
01/29/01  11:20a            4,185 scrn903__HTM.TXT
01/29/01  11:20a           31,788 scrn999__HTM.TXT
Directory of D:\M-9381 US\WEBAPP\STYLES
01/31/01  03:35p   <DIR>  .
01/31/01  03:35p   <DIR>  ..
04/12/99  12:09p              332 props__css.txt
06/22/99  11:19a              844 scrns__css.txt
Total Files Listed:
    866 File(s)     41,467,133 bytes
```

The contents of the compact disk are a part of the present disclosure, and are incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field

The present invention relates generally to pricing systems and, in particular, to a system and method of real-time pricing.

2. Description of the Related Art

Many products and services are commodities that are sold in very competitive markets. New competition can also come, for example, from product and service improvements, new products, new services, lower prices, new technology, the use of the Internet, mergers, and acquisitions. Pricing is often a major factor in a customer's decision as to what product or service to purchase or use. In many markets, the capability to manage pricing strategies better than the competition can be the competitive advantage that is needed to succeed in the competitive market.

Many different pricing strategies have been developed by companies to gain a competitive advantage over the competition. One such strategy employed by companies is "volume discounting." Companies provide volume discounts to influence consumers to purchase its products and services. Volume discounting affords the benefits of a large number or quantity of purchases, typically within a set period of time (e.g., a billing cycle). A consumer benefits from his or her prior purchases in that all the purchases in a billing cycle are considered in applying the volume discount.

Because the total volume of products or services purchased by a consumer is not known until the end of a billing cycle, the volume discount, and as a result, the actual price of the product or service as it applies to the consumer, cannot be determined until the end of a billing cycle. Thus, even though pricing may be a major or deciding factor in a consumer's decision, currently, the benefit afforded by volume discounting is determined at the end of a billing cycle. At the time the consumer considers making a product or service purchase, the consumer is provided a price that fails to account for volume discounting and, as a result, is likely higher than the price the consumer might end up paying.

Thus, the consumer is likely to base his or her purchasing decision on an incorrect price, such as, by way of example, a unit price (e.g., a price that does not take into consideration volume discounting). A company can benefit greatly by being able to provide a price that is closer to the actual price the consumer is likely to pay after accounting for the volume discounts, especially if it is a lower price. Therefore, what is needed is an infrastructure that enables a company to manage its pricing strategies and to provide a price that is more indicative of the price the consumer will ultimately pay.

SUMMARY

The present disclosure is directed to a system and corresponding methods that facilitate the calculation of a real-time price for a transaction during a billing cycle that accounts for volume discounts resulting from transactions that occurred previously during the billing cycle. A data processing system maintains a record of the transactions that occur during a billing cycle. The data processing system then calculates a real-time price quote for the transaction by applying volume discounts resulting from the transactions that previously occurred during the billing cycle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method for pricing transactions in real-time includes: receiving a request for a real-time price quote for a transaction from a first account, the request being received at a first instance in time during a billing cycle; determining a first production service, the first production service being a component of the transaction; determining a count of first production service instances representing the first production service in the received transaction; determining a billable entity for the transaction, the billable entity comprising one or more related accounts, wherein the related accounts includes the first account; determining a total of the first production service instances purchased by the related accounts during the billing cycle up to the first instance in time, the total including the count of the first production service instances in the received transaction; determining a price applicable to the total of the first production service instances based on a pricing method; and apportioning the price to the received transaction based on the count of the first production service instance in the received transaction.

In another embodiment, a method for real-time pricing includes: receiving a request for a real-time price quote for a transaction, the request being received at a first instance in time during a billing cycle, wherein the transaction comprises a number of first production service instances, each first production service instance representing a first production service; determining a total count of production service instances consumed during the billing cycle up to the first instance in time based on a pricing relationship; determining a billing service appropriate for the first production service; calculating a price for the first production service from a price table based on a first attribute for the billing service and the total count of production service instances consumed; and apportioning the price to the received transaction based on the number of first production service instances in the transaction.

In still another embodiment, a computer-readable storage medium has stored thereon computer instructions that, when executed by a computer, cause the computer to: receive a request for a real-time price quote for a transaction, the request being received at a first instance in time during a billing cycle, wherein the transaction comprises a number of first production service instances, each instance representing a first production service; determine a total count of production service instances consumed during the billing cycle up to the first instance in time based on a pricing relationship; determine a billing service appropriate for the first production service; calculate a price for the first production service from a price table based on a first attribute for the billing service and the total count of production service instances consumed; and apportion the price to the received transaction based on the number of first production service instances in the transaction.

These and other embodiments of the present invention will also become readily apparent to those skilled in the art from the following detailed description of the embodiments having reference to the attached figures, the invention not being limited to any particular embodiment(s) disclosed.

DETAILED DESCRIPTION

According to this invention, certain limitations imposed by conventional pricing systems have been overcome.

A data processing system and corresponding methods, according to an embodiment of the present invention, facilitates a real-time pricing of a transaction with volume discounting. "Transaction" here generally refers to a product or service that is offered by a provider (e.g., manufacturer, retailer, wholesaler, distributor, service provider, etc.) for consumption by one or more consumers. In one embodiment, the provider may be the operator of the data processing system. In another embodiment, the provider may purchase the services offered by the data processing system as disclosed herein from the operator or administrator of the data processing system (e.g., the provider of the transaction is different from the provider of the data processing system services).

In one embodiment, the data processing system receives during a billing cycle a request for a real-time price quote for a transaction from, for example, an account. The account may be a consumer of the transaction. The billing cycle specifies a time duration (e.g., day, week, month, quarter, year), at the end of which the account is billed for the transactions consumed or purchased during the billing cycle.

The data processing system analyzes the transaction to determine the transaction's various components. The transaction provider may define the components of the transaction. The conversion of the transaction into its components allows the transaction provider to determine the cost of the transaction, in component parts, which in turn, enable the transaction provider to determine an appropriate price for the transaction. A suitable database system for implementing the transaction analysis in accordance with the present invention is described in U.S. Pat. No. 6,052,672, entitled "DATA PROCESSING SYSTEM FOR COMPLEX PRICING AND TRANSACTIONAL ANALYSIS," which is hereby incorporated by reference in its entirety. However, other database systems can be used to implement a data processing system using the principles described herein.

In one embodiment, the data processing system calculates a real-time price for the transaction during a billing cycle as if it was the end of the billing cycle. The data processing system breaks down the transaction into its component parts. The component parts are then priced by applying a volume discount applicable to each component to determine a real-time price for each component. The data processing system then totals the real-time price of the components to determine the real-time price of the transaction.

The volume discount for a component may result from pricing relationships between parties (e.g., relationships between a number of components, accounts, customers, etc.) and the prior purchases of the component during the billing cycle up to this time by the parties in the pricing relationship. The data processing system applies the volume discount applicable to a component to determine the price of the component. Thus, the data processing system applies all the relationship pricing and volume discounting known during the billing cycle up to the time when it received the request for quote to determine the real-time price of the transaction.

In another embodiment, the data processing system calculates a variance to the real-time transaction price. At the end of the billing cycle, the data processing system calculates a price for each transaction purchased during the billing cycle. In one embodiment, the data processing system calculates a price for the transaction by determining a price for each component of a transaction in the manner outlined above. This price is then compared to the real-time price quoted during the billing cycle (e.g., at the time the request for real-time price quote is received). If there is a variance or difference between the two prices, the data processing system may make or report adjustments as necessary. For example, there may have been subsequent purchases of a component of the transaction after the time of providing the real-time price quote. The subsequent purchases of the component may result in a larger volume discount, which, in turn, causes a variance in price (e.g., results in a lower price for the transaction).

Even though this invention is suitable to providing real-time pricing of various products and services in many industries (e.g., financial services, internet services, telecommunication services, etc.), the invention will be further disclosed in the context of the data processing system providing real-time pricing with volume discounting of financial products offered by a financial services company (FSC), such as, retail bank, wholesale bank, corporate bank, and investment bank.

Figure 1:
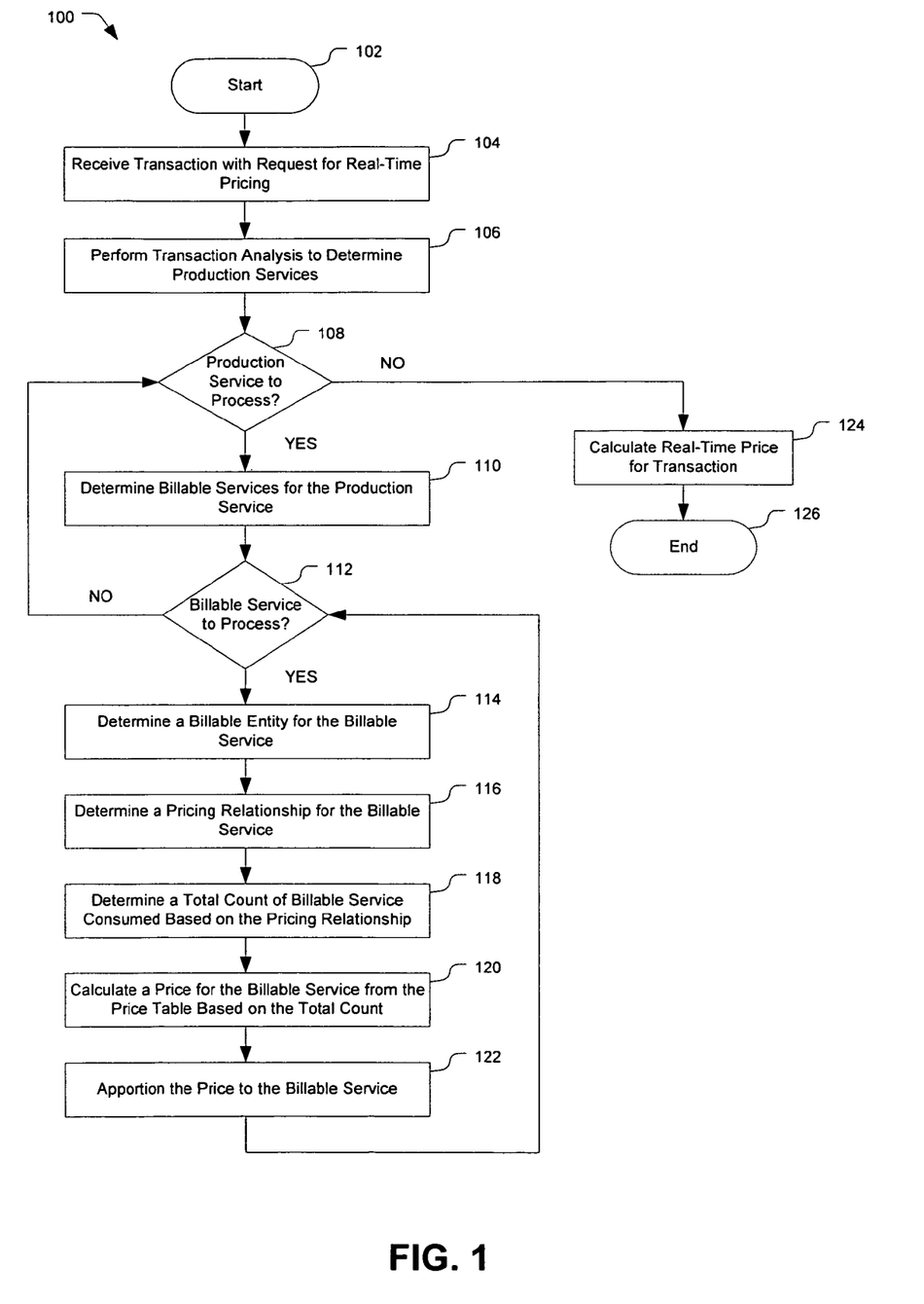
FIG. 1 illustrates a flow chart of an exemplary method for calculating a real-time price with volume discounting.
Figure 2:
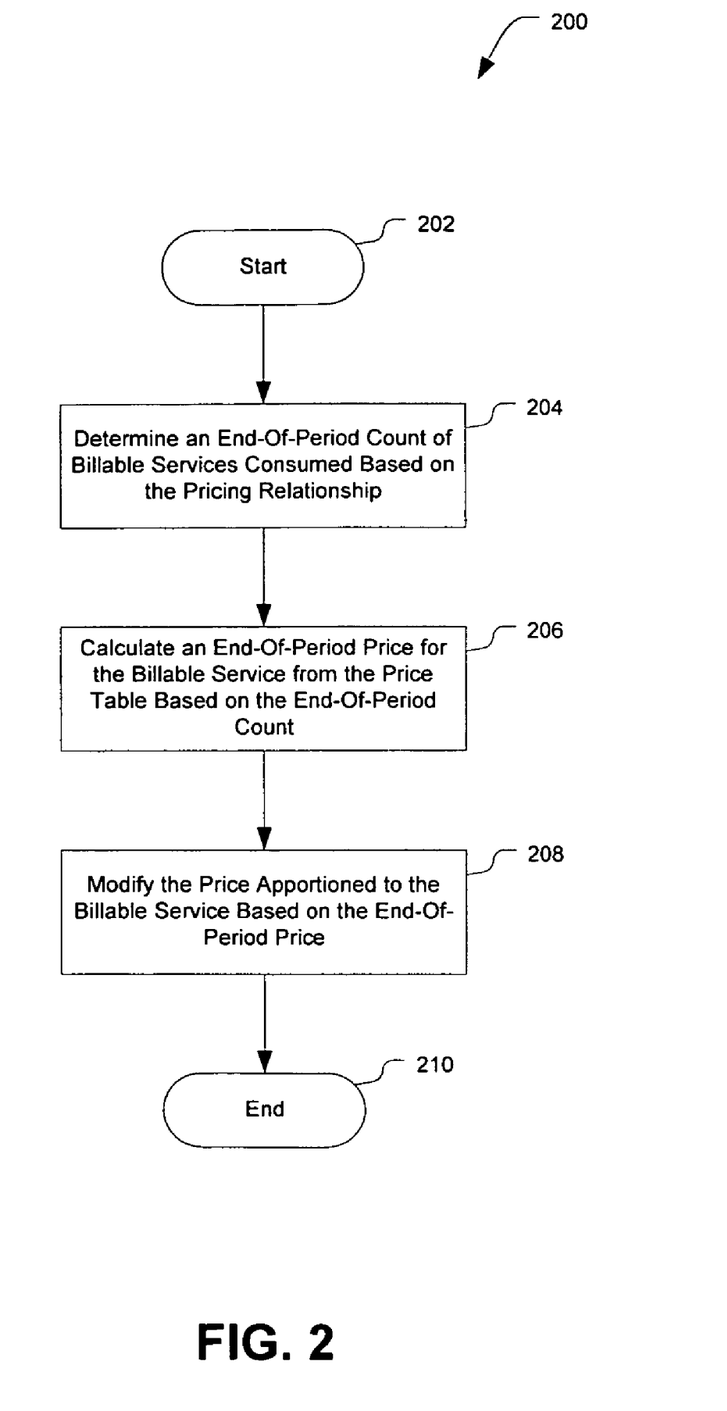
FIG. 2 illustrates a flow chart of an exemplary method for calculating a variance to a real-time price with volume discounting.

Embodiments of the present invention are understood by referring to FIGS. 1-2 of the drawings. Throughout the drawings, components that correspond to components shown in previous figures are indicated using the same reference numbers.

The detailed description that follows is presented in terms of processes and symbolic representations of operations performed by conventional computers.

Transaction Overview

A transaction instance (e.g., financial transaction instance) takes place when a FSC provides a financial service and when a client or consumer purchases or consumes the financial service. For example, an FSC may provide one or more financial services that are bundled together and offered to clients as financial transactions. Examples of financial transactions are checking accounts, cash management accounts, mortgages, funds transfers, safe deposit boxes, and the like.

In one embodiment, an FSC can use the data processing system to provide a real-time pricing of one or more financial transactions. Each financial transaction is defined in the data processing system in its component parts called production services. Thus, a financial transaction is related to the production services that map to or make up the financial transaction. The production services defining a particular financial transaction are the individual actions that the FSC performs or that the FSC wishes to account for in performing or processing the financial transaction. Production services for a financial transaction may include, by way of example, debit from an account, credit to an account, over draft approval, and computer connection. Production services are akin to a bill of materials for a manufacturer in that each transaction can be defined by the production services that are required to build or provide that transaction.

For clarity, the language of U.S. Pat. No. 6,052,672 is used herein. In particular, to distinguish an actual occurrence of a financial transaction performed by an FSC from a representation of the financial transaction in the data processing system, the actual occurrence of the financial transaction will be referred to as a financial transaction instance. Similarly, a production service instance is the representation of an actual occurrence of a specific production service performed by the FSC.

A production service is further defined in the data processing system in its component parts called billing or billable services. Billing services and billable service are used interchangeably herein. The billable services are related to activities having a cost or price, enabling the FSC to determine the cost of providing the financial transaction and the fees or prices the FSC is going to derive, earn, or charge the consumer (e.g., account) of the transaction. In one embodiment, the billable services are what appear on an accounting statement sent to the consumer. Thus, the consumer is informed of the transactions consumed, the related production services consumed, the related billable services consumed, and the price charged for each of the billable services.

A billable service may be mapped to one or more price tables in the data processing system. The cost and/or price associated with a billable service is recorded in a price table. The price table includes pricing rules for the associated billable service.

The data processing system maintains records for one or more billable entities. "Billable entity" here generally refers to a grouping of accounts for the purpose of applying volume discounting. Volume discounting may span the activity of the accounts within the billable entity. An account may be thought of as the consumer of the transaction. For example, a customer may actually be many companies or related companies that may be transacting with the FSC on one or more accounts. The billable entity is a composition of the accounts without regard to who the customers are, or whether one customer is involved or more than one customers are involved. Thus, volume discounting may span the activity of the accounts within a particular billable entity without regard to who the actual customers are or the number of customers involved in the billable entity.

In one embodiment, the data processing system provides for relationship pricing in conjunction with volume discounting. A pricing relationship may exist between a number of billable services, accounts, customers, and the like. For relationship pricing, the billable services, accounts, or customers in a relationship are factored in calculating a real-time price for a transaction. Relationship pricing in conjunction with volume discounting is an application of the volume discount based on the activities of the elements (i.e., billable services, accounts, customers) in a particular pricing relationship.

For example, as explained above, a group of accounts may be grouped together in a billable entity, creating a pricing relationship for the purposes of applying a volume discount. In another example, a group of billable services may be grouped together, creating a pricing relationship for the purposes of applying a volume discount. The volume discount is determined from the activity of the billable services within the group across all accounts in a particular billing entity. In still another example, a pricing relationship can exist for a group of accounts (e.g., not a complete billing entity) for a particular billable service. The volume discount is determined from the activity of the particular billing service across the group of accounts.

Billable services, pricing of billable services, pricing relationships, and relationship pricing is further described in U.S. Pat. No. 6,052,672. Pricing methods, including volume discounting is further described in the co-pending and commonly owned U.S. patent application Ser. No. 09/183/335 entitled "DATA PROCESSING SYSTEM FOR PRICING, COSTING AND BILLING OF FINANCIAL TRANSACTIONS."

Method for Calculating a Real-Time Price with Volume Discounting

In one embodiment, the data processing system facilitates the calculation of a real-time price for a financial transaction with volume discounting at any time in a billing cycle. The data processing system contains data and program logic to receive a request to provide a real-time price quote for a financial transaction and calculates a real-time price that includes applicable volume discounts. The data processing system calculates the real-time price for the financial transaction irrespective of point in time within a particular billing cycle. The volume discounting is determined from pricing relationships provided by the data processing system.

FIG. 1 illustrates a flow chart of an exemplary method 100 for calculating a real-time price of a financial transaction with volume discounting. Beginning at a start step 102, an FSC creates and defines the financial transactions and the mapping rules for the transactions, including the production services and the billing services, as maintained in the data processing system. The FSC also creates and defines the billing entities, accounts, pricing relationships, etc. maintained in the data processing system.

For example, the FSC defines a "wire transfer" as one financial transaction. The wire transfer is mapped to include three production services: "debit from account," "credit to account," and "overdraft protection." Each of the production services is mapped to a respective billable service, and each billable service is respectively mapped to a price table. The FSC may create a billing entity to include four accounts: "Account A," "Account B," "Account C," and "Account D." Accounts A and B belong to Company ABC, and Accounts C and D belong to Company XYZ. The FSC sets a monthly billing cycle for the billing entity.

Furthermore, the FSC may agree to and create a pricing relationship for Accounts A, B, and C for the overdraft protection service. The pricing relationship entitles Accounts A, B, and C to the following volume discounting for the overdraft protection service:

| | |
|---|---|
| Quantity 1 to 20 | $4.00/each |
| Quantity 21 to 50 | $3.00/each |
| Quantity 51 to 100 | $2.00/each |
| Quantity 100+ | $1.00/each |

Thus, if the combined volume of overdraft protections used or purchased by the group of accounts in the pricing relationship (Accounts A, B, and C) exceed twenty, all the volume of overdraft protections purchased is priced at $3.00 each. Likewise, if the combined volume of overdraft protections purchased by the group of accounts in the pricing relationship exceed fifty or one hundred, all the volume of overdraft protections purchased is priced at $2.00 each or $1.00 each, respectively. Otherwise, the first twenty overdraft protections are priced at $4.00 each.

At step 104, the FSC receives a request for a real-time price quote for a financial transaction from a customer. Typically, the customer establishes one or more accounts with the FSC, and specifies a particular account in requesting the real-time quote for the financial transaction. In particular, the financial transaction data and the request for the real-time price quote is input into, and received by the data processing system. Continuing the wire transfer example, Company ABC, using Account A, may request a real-time price quote for a wire transfer. The request may have been submitted during a billing cycle, for example, the tenth day of the month.

At step 106, the data processing system performs transaction analysis on the financial transaction to determine the associated production services. In the above example, the data processing system determines that the wire transfer maps to, and is associated with the debit from account, credit to account, and overdraft protection production services.

At step 108, the data processing system determines if there is a production service to process or if it has processed all the production services. If there is a production service to process, the data processing system identifies the production service and determines the appropriate billable services associated with the identified production service at step 110. A production service may map to one or more billable services. Continuing the above example, the data processing system may start by processing the overdraft protection production service (step 108). The data processing system then determines that the overdraft protection service maps to a single billable service (step 110).

At step 112, the data processing system determines if there is a billable service to process. If all the billable services for the production service have been processed, the data processing system returns to step 108 to process the next production service. If there is a billable service to process, the data processing system identifies the billable service and determines the billing entity (i.e., billable entity) for the billable service at step 114. Continuing the above example, the data processing system determines that for the overdraft protection service, it has to process the associated billable service (step 112) and that the billing entity includes Accounts A, B, C, and D (step 114).

At step 116, the data processing system determines if there is a pricing relationship established for the billable service. Continuing the above example, the data processing system determines that a pricing relationship exists between Accounts A, B, and C for the overdraft protection service. Thus, for the billable service associated with the overdraft protection service requested by Account A, an applicable pricing relationship exists.

At step 118, the data processing system determines the total count of the billable service consumed or purchased by the accounts in the pricing relationship. The data processing system maintains a record of the number of the number of billable service instances purchased by the accounts in the pricing relationship. Continuing the above example, the data processing system determines the number of billable service instances purchased by Accounts A, B, and C up to this point (i.e., tenth day) in the current billing cycle. For example, in this current billing cycle, a total of fifty overdraft protections may have been purchased (none by Account A, twenty by Account B, and thirty by Account C). Thus, the current overdraft protection would be the fifty-first purchased in the current billing cycle.

At step 120, the data processing system calculates a price for the billable service from an associated price table based on the total number of billable service instances. The data processing system applies any applicable volume discount resulting from the billable service instances purchased by the accounts in the pricing relationship. Continuing the above example, the data processing system determines from the price table for the billable service associated with the overdraft protection service that the fifty-first overdraft protection instance purchased results in all the overdraft protection instances purchased by the group of accounts in the pricing relationship to be priced at $2.00 each. Thus, fifty-one overdraft protection instances is priced at a total price of $102.00.

At step 122, the data processing system apportions the portion of the total price for the billable service instances to the current billable service being processed. Continuing the above example, the data processing system apportions a price of $2.00 (1/51 of the total price of $102.00) to the current billable service associated with the overdraft protection. Thus, the current billable service associated with the overdraft protection is priced at $2.00. Thus, Account A benefits from the billable service instances purchased by Accounts B and C. Company ABC (Account A) receives a volume discount as a result of purchases made by Company XYZ (Account C). The data processing system then returns to step 112 to continue processing the next billable service associated with the overdraft protection service.

The data processing system processes the other production services (i.e., debit from account and credit to account) associated with the financial transaction (i.e., wire transfer) in the manner described above. If, at step 108, all the production services for the financial transaction have been processed, the data processing system calculates the real-time price quote for the requested financial transaction at step 124. The financial transaction price is determined by summing the prices of the associated billable services. The data processing system provides the real-time price quote and ends at step 126.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

Method for Calculating a Variance to a Real-Time Price

In one embodiment, the data processing system recalculates the price for the financial transactions and the associated billable services at the end of the billing cycle to account for and accommodate changes that occurred during a billing cycle. The recalculation may result in a variance to the real-time price quoted and charged for a financial transaction to an account during the billing cycle. A variance to the price may result from reasons such as, by way of example, a change to a billing entity resulting in a change in applicable price table(s), a change to an allocation of an account to different departments or market segments resulting in a change in applicable price table(s), a new price becoming effective during a billing cycle, a change in a pricing relationship, additional financial transactions purchased during a billing cycle, and the like. The data processing system may report the variances between the real-time price and the end-of-billing cycle price to the FSC, for example, as either discounts or adjustments.

FIG. 2 illustrates a flow chart of an exemplary method 200 for calculating a variance to a real-time price with volume discounting. Beginning at a start step 202, the data processing system identifies the financial transactions that occurred during the prior billing cycle. The data processing system may perform a transaction analysis for each financial transaction and determine the associated production services and billable services.

At step 204, the data processing system performs an end-of-billing cycle pricing for each billable service instance that occurred during the just ended billing cycle. In particular, the data processing system, for each billable service instance, determines the account that purchased the billable service instance. The data processing system identifies any applicable pricing relationships for the account. For example, there may have been a change in the pricing relationship. Continuing the above wire transfer example, the pricing relationship may have been changed during the billing cycle to include Account D, and Account D may have purchased forty overdraft protections during the billing cycle.

The data processing system determines an end-of-billing cycle count of the total number of billable service instances purchased by the accounts during the recently ended billing cycle. Continuing the above wire transfer example, between the tenth day of the billing cycle and the end of the billing cycle, Account A may have purchased an additional nine-teen overdraft protection services, for a total of twenty, at a price of $2.00 each. Thus, the accounts in the pricing relationship at the end of the billing cycle (Accounts A, B, C, and D) purchased a total of one hundred and ten overdraft protection services (twenty by Account A, twenty by Account B, thirty by Account C, and forty by Account D).

At step 206, the data processing system calculates an end-of-billing cycle price for the billable service instances purchased during the billing cycle from the associated price table based on the end-of-billing cycle count. Continuing the above example, the data processing system determines from the price table that at a volume of one hundred and ten overdraft protection services, all the overdraft protection instances purchased by the accounts in the pricing relationship should be charged $1.00 each. Thus, the one hundred and ten overdraft protection instances is priced at a total of $110.00.

At step 208, the data processing system modifies the price apportioned to the billable service based on the end-of-billing cycle price. The data processing system calculates the variance between the real-time price quoted and charged for each billable service instance and the end-of-billing cycle price for the billable service instance. Continuing the above example, the data processing system determines that Account A was charged a total price of $40.00 ($2.00 for each overdraft protection service) for the twenty overdraft protection service instances purchased during the billing cycle. The data processing system calculates the end-of-billing cycle price for the twenty overdraft protection service instances purchased by Account A to be $20.00 ($1.00 for each overdraft protection service). Thus, there is a variance of $20.00 for the twenty overdraft protections service instances purchased by Account A.

The data processing system calculates the variance for the remaining billable services and ends at step 210. In one embodiment, the data processing system generates a report to the FSC to report the end-of-billing cycle pricing. The report may include the calculated variances for each billable service, financial transaction, account, billing entity, etc. Thus, the data processing system efficiently adjusts to and incorporated changes to the billing parameters that occur during a billing cycle.

In one embodiment, a price variance may result from a change to an allocation of an account to a different department or market segment. This may result in a change to one or more applicable price tables for a billable service. The change the applicable price tables may affect the volume discount calculation and any applicable exception pricing calculation. Implementation of exception pricing is described in U.S. Pat. No. 6,052,672.

As described herein, the present invention in at least one embodiment facilitates a real-time pricing of a financial transaction during a billing cycle that accounts for applicable volume discounts. One embodiment of the present invention provides a data processing system that receives and processes a request to provide a real-time price quote for a financial transaction. The data processing system maintains a record of the billable service instances purchased during the billing cycle, and is able to account for applicable volume discounts in calculating a real-time price quote for the financial transaction at any instance in time during the billing cycle.

In at least one embodiment, the data processing system maintains a record of one or more pricing relationships. A pricing relationship may include one or more accounts, one or more services, or a combination or one or more accounts and services. The data processing system maintains a record of the billable service instances purchased by the accounts in an applicable pricing relationship, and is able to account for the applicable volume discounts resulting from the pricing relationship in calculating a real-time price quote for the financial transaction during the billing cycle.

In at least one embodiment, the data processing system performs an end-of-billing period price calculation to identify variances to the real-time price quotes generated during the billing cycle. The calculated variances are reported to the FSC as discounts or adjustments to the price of the financial transactions. The data processing system permits changes to be made during a billing cycle, and the changes are reflected in the previously calculated and quoted real-time prices.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A method for pricing transactions in real-time, the method comprising:
    receiving by a computerized data processing system a request for a real-time price quote for a transaction of a first account, the request being received at a first instance in time during a billing cycle;
    said data processing system determining a first production service, the first production service being a component of the transaction;
    said data processing system determining a count of first production service instances representing the first production service in the transaction;
    said data processing system determining a billable entity for the transaction, the billable entity comprising one or more related accounts, wherein the one or more related accounts includes the first account;
    said data processing system determining a total of the first production service instances associated with the one or more related accounts during the billing cycle up to the first instance in time, the total including the count of the first production service instances in the transaction;
    said data processing system determining a price applicable to the total of the first production service instances based on a pricing method; and
    said data processing system apportioning the price to the transaction based on the count of the first production service instances in the transaction.

2. The method of claim 1, wherein the pricing method is "flat fee".

3. The method of claim 1, wherein the pricing method is "minimum revenue".

4. The method of claim 1, wherein the pricing method is "tiering".

5. The method of claim 1, wherein the pricing method is "volume discounts".

6. The method of claim 1 further comprising:
    determining a billable service related to a pricing of the first production service; and
    determining a price table related to the transaction, the price table containing a price for the billable service.

7. The method of claim 1 further comprising: calculating a variance to the price comprising:
    determining an end-of-period total of the first production service instances associated with the one or more related accounts during the billing cycle;
    based on the pricing method, determining an end-of-period price applicable to the end-of-period total of the first production service instances; and
    based on the end-of-period price, modifying the first price apportioned to the transaction.

8. The method of claim 1 further comprising:
    determining one or more related production services, each of the one or more related production services being related to the first production service;
    determining a count of related production service instances representing the number of related production services associated with the one or more related accounts during the billing cycle up to the first instance in time, the count of the related production service instances including the count of the first production service instances in the transaction;

based on the pricing method, determining a related production service price applicable to the count of the related production service instances; and based on the count of the first production service instances in the transaction, apportioning the related production service price to the transaction.

9. A method for real-time pricing comprising:

receiving by a computerized data processing system a request for a real-time price quote for a transaction, the request being received at a first instance in time during a billing cycle, wherein the transaction comprises a number of first production service instances, each first production service instance relating to a first production service;

based on a pricing relationship said data processing system, determining a total count of production service instances consumed during the billing cycle up to the first instance in time;

said data processing system determining a billable service appropriate for the first production service;

said data processing system calculating a price for the first production service from a price table based on a first attribute for the billable service and the total count of production service instances consumed; and said data processing system apportioning the price to the transaction based on the number of first production service instances in the transaction.

10. The method of claim 9 further comprising creating a record of the transaction.

11. The method of claim 9 further comprising creating the first production service, the first production service being a component of the transaction.

12. The method of claim 9, wherein the transaction is to be carried out for a customer, and wherein the method further comprises creating the pricing relationship, the pricing relationship related to the first production service and to the customer.

13. The method of claim 9 further comprising creating the billable service related to a pricing of the first production service.

14. The method of claim 9 further comprising creating the price table related to the transaction, the price table containing the first attribute for the billable service.

15. The method of claim 9, wherein the pricing relationship relates to a billable entity.

16. The method of claim 9, wherein the pricing relationship relates to one or more related accounts.

17. The method of claim 9, wherein the pricing relationship relates to one or more related production services.

18. The method of claim 9, wherein the total count of production service instances consumed comprises a count of the first production service instances consumed.

19. The method of claim 9, wherein the total count of production service instances consumed comprises a count of production service instances consumed in one or more related accounts.

20. The method of claim 9, wherein the first attribute comprises a pricing method.

21. The method of claim 20, wherein the pricing method is "flat fee".

22. The method of claim 20, wherein the pricing method is "minimum revenue".

23. The method of claim 20, wherein the pricing method is "tiering".

24. The method of claim 20, wherein the pricing method is "volume discounts".

25. The method of claim 9 further comprising:

calculating a variance to the calculated price comprising:

based on the pricing relationship, determining an end-of-period count of production service instances consumed during the billing cycle;

calculating an end-of-period price for the first production service from the price tables based on the first attribute for the billable service and the end-of-period count of production service instances consumed; and based on the end-of-period price, modifying the price apportioned to the transaction.

26. A computer-readable storage medium having stored thereon computer instructions that, when executed by a computer, cause the computer to:

receive a request for a real-time price quote for a transaction, the request being received at a first instance in time during a billing cycle, wherein the transaction comprises a number of first production service instances, each first production service instance a first production service;

based on pricing relationship, determine a total count of production service instances consumed during the billing cycle up to the first instance in time;

determine a billable service appropriate for the first production service; calculate a price for the first production service from a price table based on a first attribute for the billable service and the total count of production service instances consumed;

apportion the price to the transaction based on the number of first production service instances in the transaction; and provide the price as data to be included in determining service charges to a customer associated with the transaction.

27. The computer-readable storage medium of claim 26, wherein the pricing relationship relates to a billable entity.

28. The computer-readable storage medium of claim 26, wherein the pricing relationship relates to one or more related accounts.

29. The computer-readable storage medium of claim 26, wherein the pricing relationship relates to one or more related production services.

30. The computer-readable storage medium of claim 26, wherein the total count of production service instances consumed comprises a count of the first production service instances consumed.

31. The computer-readable storage medium of claim 26, wherein the total count of production service instances consumed comprises a count of production service instances consumed in one or more related accounts.

32. The computer-readable storage medium of claim 26, wherein the first attribute comprises a pricing method.

33. The computer-readable storage medium of claim 26, wherein the computer instructions that receive a request for a real-time price quote further comprise computer instructions that, when executed by a computer, cause the computer to record the transaction.

34. The computer-readable storage medium of claim 26, wherein the computer instructions that receive a request for a real-time price quote further comprise computer instructions that, when executed by a computer, cause the computer to record the first production service, the first production service being a component of the transaction.

35. The computer-readable storage medium of claim 26, wherein the computer instructions that receive a request for a real-time price quote further comprise computer instructions that, when executed by a computer, cause the computer to record the pricing relationship, the pricing relationship being related to the first production service.

36. The computer-readable storage medium of claim 26, wherein the computer instructions that receive a request for a real-time price quote further comprise computer instructions that, when executed by a computer, cause the computer to record the billable service related to a pricing of the first production service.

37. The computer-readable storage medium of claim 26, wherein the computer instructions that receive a request for a real-time price quote further comprise computer instructions that, when executed by a computer, cause the computer to record the price table related to the transaction, the price table containing the first attribute for the billable service.

38. The computer-readable storage medium of claim 26, wherein the computer instructions that receive a request for a real-time price quote further comprise computer instructions that, when executed by a computer, cause the computer to:
- based on the pricing relationship, determine an end-of-period count of production service instances consumed during the billing cycle;
- calculate an end-of-period price for the first production service from the price table based on the first attribute for the billable service and the end-of-period count of production service instances consumed; and
- based on the end-of-price, modify the price apportioned to the transaction.

\* \* \* \* \*

UNITED STATES PATENT AND TRADEMARK OFFICE
CERTIFICATE OF CORRECTION

| | | |
|---|---|---|
| PATENT NO. | : 7,606,744 B1 | Page 1 of 1 |
| APPLICATION NO. | : 09/785783 | |
| DATED | : October 20, 2009 | |
| INVENTOR(S) | : Robert A. Foster | |

It is certified that error appears in the above-identified patent and that said Letters Patent is hereby corrected as shown below:

At col. 24, line 23, insert after "instance" -- relating to --.
At col. 24, line 24, insert after "on" -- a --.
At col. 26, line 14, replace "end-of-price" by -- end-of-period price --.

Signed and Sealed this

Twentieth Day of July, 2010

David J. Kappos
*Director of the United States Patent and Trademark Office*